United States Patent
Horie et al.

(10) Patent No.: US 10,197,673 B2
(45) Date of Patent: Feb. 5, 2019

(54) MOBILE TERMINAL, WEARABLE TERMINAL, SONIC DISTANCE MEASUREMENT SYSTEM, AND SONIC DISTANCE MEASUREMENT METHOD

(71) Applicant: Sony Computer Entertainment Inc., Tokyo (JP)

(72) Inventors: Kazuyoshi Horie, Tokyo (JP); Hideyuki Sasaki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 271 days.

(21) Appl. No.: 15/059,780

(22) Filed: Mar. 3, 2016

(65) Prior Publication Data
US 2016/0291116 A1   Oct. 6, 2016

(30) Foreign Application Priority Data
Apr. 3, 2015  (JP) ................................ 2015-077030

(51) Int. Cl.
*G01S 15/00*   (2006.01)
*G01S 15/74*   (2006.01)

(52) U.S. Cl.
CPC ..................... *G01S 15/74* (2013.01)

(58) Field of Classification Search
CPC ........................................................ G01S 15/74
See application file for complete search history.

(56) References Cited

U.S. PATENT DOCUMENTS

| 6,678,209 B1 | 1/2004 | Peng et al. |
| 2005/0088641 A1* | 4/2005 | Hung ............. G01S 7/497 356/4.02 |
| 2005/0286345 A1* | 12/2005 | Arvelo ........... G01S 7/52004 367/131 |

(Continued)

FOREIGN PATENT DOCUMENTS

| JP | 01-101488 A | 4/1989 |
| JP | 05-240954 A | 9/1993 |

(Continued)

OTHER PUBLICATIONS

Japanese Office Action dated Dec. 13, 2016 for the Corresponding Japanese Patent Application No. 2015-077030.

*Primary Examiner* — Hovhannes Baghdasaryan
(74) *Attorney, Agent, or Firm* — Katten Muchin Rosenman LLP

(57) ABSTRACT

Disclosed herein is a mobile terminal including: a reproducing section adapted to reproduce a first distance measurement signal; a recording section adapted to record the first distance measurement signal and a second distance measurement signal output from other mobile terminal; a time difference measurement section adapted to measure a first difference between recording start times of the first and second distance measurement signals; a communication section adapted to receive a second difference between recording start times of the first and second distance measurement signals from the other mobile terminal, the second difference being measured by the other mobile terminal; and a distance calculation section adapted to calculate a distance to the other mobile terminal by multiplying the subtraction result between the first and second differences by the speed of sound.

7 Claims, 16 Drawing Sheets

(56) References Cited

U.S. PATENT DOCUMENTS

| | | | | |
|---|---|---|---|---|
| 2008/0304361 A1* | 12/2008 | Peng | ................. | G01S 15/74 367/127 |
| 2010/0097070 A1* | 4/2010 | Crick | ................. | G01R 29/0835 324/525 |
| 2016/0291163 A1* | 10/2016 | Wallace | ................. | G01S 1/042 |

FOREIGN PATENT DOCUMENTS

| | | | |
|---|---|---|---|
| JP | 2003-043143 | A | 2/2003 |
| JP | 2009-236776 | A | 10/2009 |
| JP | 2014-066529 | A | 4/2014 |
| JP | 2015-014504 | A | 1/2015 |

\* cited by examiner

MOBILE TERMINAL, WEARABLE TERMINAL, SONIC DISTANCE MEASUREMENT SYSTEM, AND SONIC DISTANCE MEASUREMENT METHOD

BACKGROUND

The present disclosure relates to a technology for measuring a distance using acoustic signals.

Measurement using a tape measure or other tool, photonic distance measurement using laser beams and so on, and sonic distance measurement using ultrasonic waves are among distance measurement techniques. Although ordinary people normally use a tape measure, not many usually carry their tape measure with them. If one wishes to measure the length of an object or the distance between two points when he or she is away from home, there is no other alternative but to make a rough measurement on the basis of the distance between the thumb and small finger or the distance between the left and right hands with the two hands spread sideways in the absence of a tape measure.

Smartphones are usually carried by many people with them. Smartphones incorporate a speaker and a microphone. Further, recent years have witnessed a large number of wearable terminals such as smart watches coming onto the market. Some wearable terminals designed to support a verbal communication function incorporate a speaker and a microphone.

SUMMARY

The inventors et al. of the present application focused attention on incorporation of a speaker and a microphone in smartphones and conceived a sonic distance measurement method using these mobile terminals carried usually. When sonic distance measurement is conducted using two mobile terminals, it is necessary to synchronize the two terminals in time, calibrate the terminals, or perform other tasks, thus making sonic distance measurement time- and effort-consuming.

Further, in the case of sonic distance measurement using mobile terminals, the measurement capability is directly affected by surrounding noise. That is, the distance measurement signal sound is buried in surrounding noise, making accurate distance measurement difficult.

In light of the foregoing, it is desirable to provide a technology for permitting simple and convenient sonic distance measurement using mobile terminals. It is also desirable to provide a technology for permitting stable sonic distance measurement even in a noise-exposed environment.

According to an embodiment of the present disclosure, there is provided a mobile terminal. The mobile terminal includes a reproducing section, a recording section, a time difference measurement section, a communication section, and a distance calculation section. The reproducing section reproduces a first distance measurement signal. The recording section records the first distance measurement signal and a second distance measurement signal output from other mobile terminal. The time difference measurement section measures a first difference between recording start times of the first and second distance measurement signals. The communication section receives a second difference between recording start times of the first and second distance measurement signals from the other mobile terminal. The second difference is measured by the other mobile terminal. The distance calculation section calculates a distance to the other mobile terminal by multiplying the subtraction result between the first and second differences by the speed of sound.

According to another embodiment of the present disclosure, there is provided a wearable terminal. The wearable terminal engages in short-range wireless communication with a mobile terminal adapted to output a first distance measurement signal. The wearable terminal includes a reproducing section, a recording section, a time difference measurement section, and a communication section. The reproducing section reproduces a second distance measurement signal. The recording section records the second distance measurement signal and the first distance measurement signal output from the mobile terminal. The time difference measurement section measures a difference between recording start times of the first and second distance measurement signals. The communication section transmits the difference, measured by the time difference measurement section, to the mobile terminal.

According to still another embodiment of the present disclosure, there is provided a sonic distance measurement system. The sonic distance measurement system includes first and second mobile terminals. The first mobile terminal includes a reproducing section, a recording section, a time difference measurement section, a communication section, and a distance calculation section. The reproducing section reproduces a first distance measurement signal. The recording section records the first distance measurement signal and a second distance measurement signal output from the second mobile terminal. The time difference measurement section measures a first difference between recording start times of the first and second distance measurement signals. The communication section receives a second difference between recording start times of the first and second distance measurement signals from the other mobile terminal. The second difference is measured by the second mobile terminal. The distance calculation section calculates a distance to the second mobile terminal by multiplying the subtraction result between the first and second differences by the speed of sound. The second mobile terminal includes a reproducing section, a recording section, a time difference measurement section, and a communication section. The reproducing section reproduces the second distance measurement signal. The recording section records the second distance measurement signal and the first distance measurement signal output from the first mobile terminal. The time difference measurement section measures the second difference between the recording start times of the first and second distance measurement signals. The communication section transmits the second difference, measured by the time difference measurement section, to the first mobile terminal.

According to still another embodiment of the present disclosure, there is provided a sonic distance measurement method. The sonic distance measurement method includes reproducing, recording, measuring, communicating, and calculating. The reproducing reproduces a first distance measurement signal. The recording records the first distance measurement signal and a second distance measurement signal output from a wearable terminal. The measuring measures a first difference between recording start times of the first and second distance measurement signals. The communicating receives a second difference between recording start times of the first and second distance measurement signals from the wearable terminal. The second difference is measured by the wearable terminal. The calculating calculates a distance to the wearable terminal by multiplying the subtraction result between the first and second differences by the speed of sound.

According to still another embodiment of the present disclosure, there is provided a program for a computer. The program includes reproducing by a reproducing section, recording by a recording section, measuring by a time difference measurement section, communicating by a communication section, and calculating by a distance calculation section. The reproducing reproduces a first distance measurement signal. The recording records the first distance measurement signal and a second distance measurement signal output from a wearable terminal. The measuring measures a first difference between recording start times of the first and second distance measurement signals. The communicating receives a second difference between recording start times of the first and second distance measurement signals from the wearable terminal. The second difference is measured by the wearable terminal. The calculating calculates a distance to the wearable terminal by multiplying the subtraction result between the first and second differences by the speed of sound.

It should be noted that any combinations of the above components and any conversions of expressions of the present disclosure between "method," "device," "system," "computer program," "data structure," "recording medium," and so on are also effective as modes of the present disclosure.

The present disclosure permits sonic distance measurement in a simple and convenient manner by using mobile terminals. Further, the present disclosure permits stable sonic distance measurement even in a noise-exposed environment.

DETAILED DESCRIPTION OF THE PREFERRED EMBODIMENTS

Figure 1:
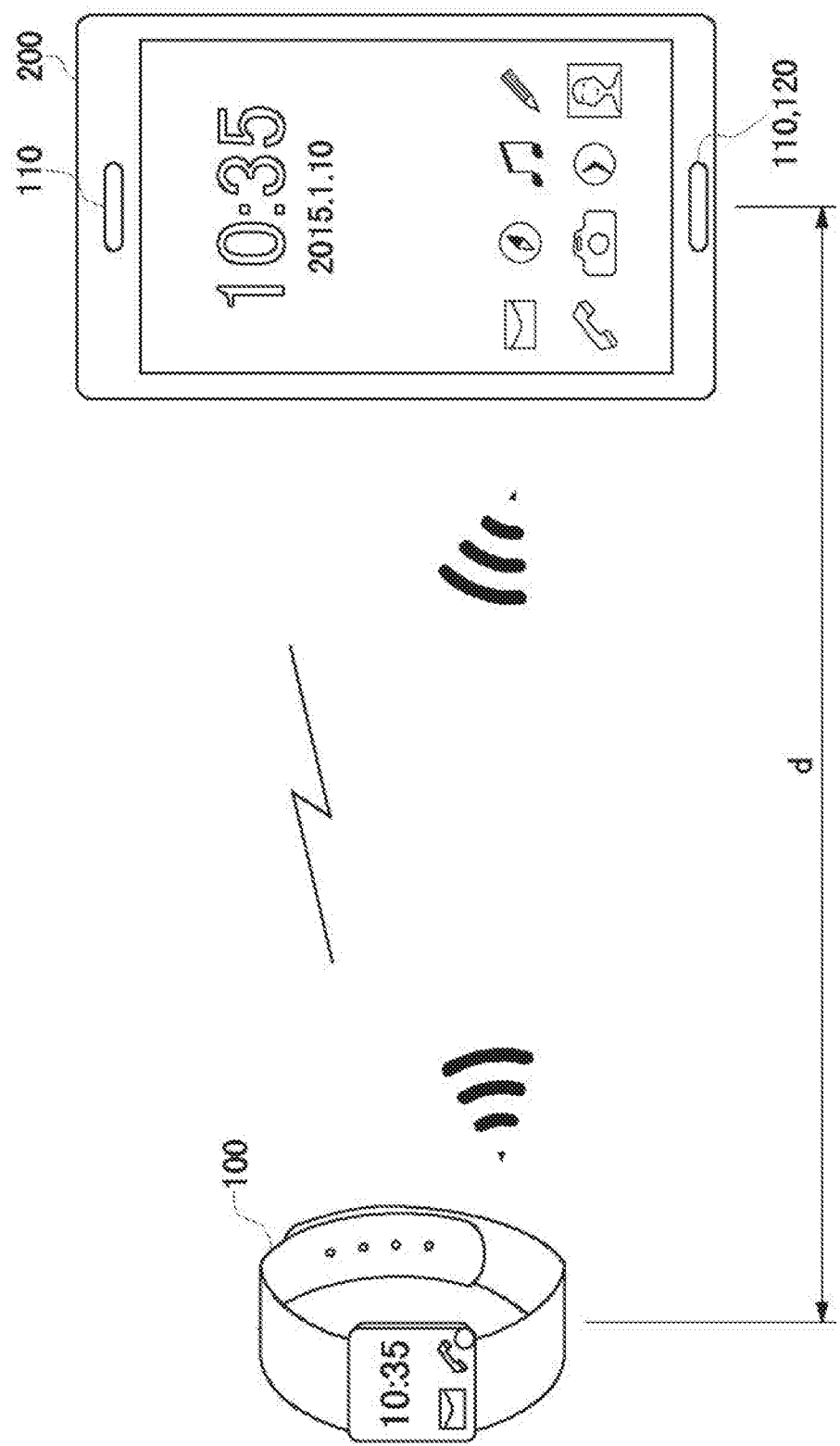
FIG. 1 is a schematic diagram of a sonic distance measurement system according to an embodiment.

FIG. 1 is a schematic diagram of a sonic distance measurement system according to an embodiment. Here, a sonic distance measurement system is illustrated as an example using a wearable terminal 100 and a smartphone 200. However, it is possible to configure a sonic distance measurement system if two smartphones, each having a speaker and a microphone, are available. In the present embodiment, a speaker 110 is provided at the top portion of the touch panel surface of the smartphone 200, with the other speaker 110 and a microphone 120 provided at the bottom portion thereof. Although not depicted, a speaker and a microphone are also provided on the wearable terminal 100.

The user holds the smartphone 200 in his or her hand and places the wearable terminal 100 at an end point of the target to be measured. Alternatively, the wearable terminal 100 may be tied up to the end point with a wristband rather than placing the wearable terminal 100. Still alternatively, the wearable terminal 100 may be held by other person. The user operates the smartphone 200 at the other end point of the target to be measured, thus initiating distance measurement. A sonic distance measurement application is installed in the smartphone 200 so that the user starts the application to proceed with distance measurement.

The wearable terminal 100 and the smartphone 200 can exchange information with each other by Bluetooth (registered trademark) or other short-range wireless communication technology.

The sound of a distance measurement signal output from the speaker of the wearable terminal 100 is supplied not only to the microphone of the wearable terminal 100 for recording but also to the microphone of the smartphone 200 for the same purpose. Further, the sound of a distance measurement signal output from the speaker of the smartphone 200 is supplied not only to the microphone of the smartphone 200 for recording but also to the microphone of the wearable terminal 100 for the same purpose. A distance d between the wearable terminal 100 and the smartphone 200 is measured on the basis of sonic data recorded by the wearable terminal 100 and the smartphone 200.

Figure 2:
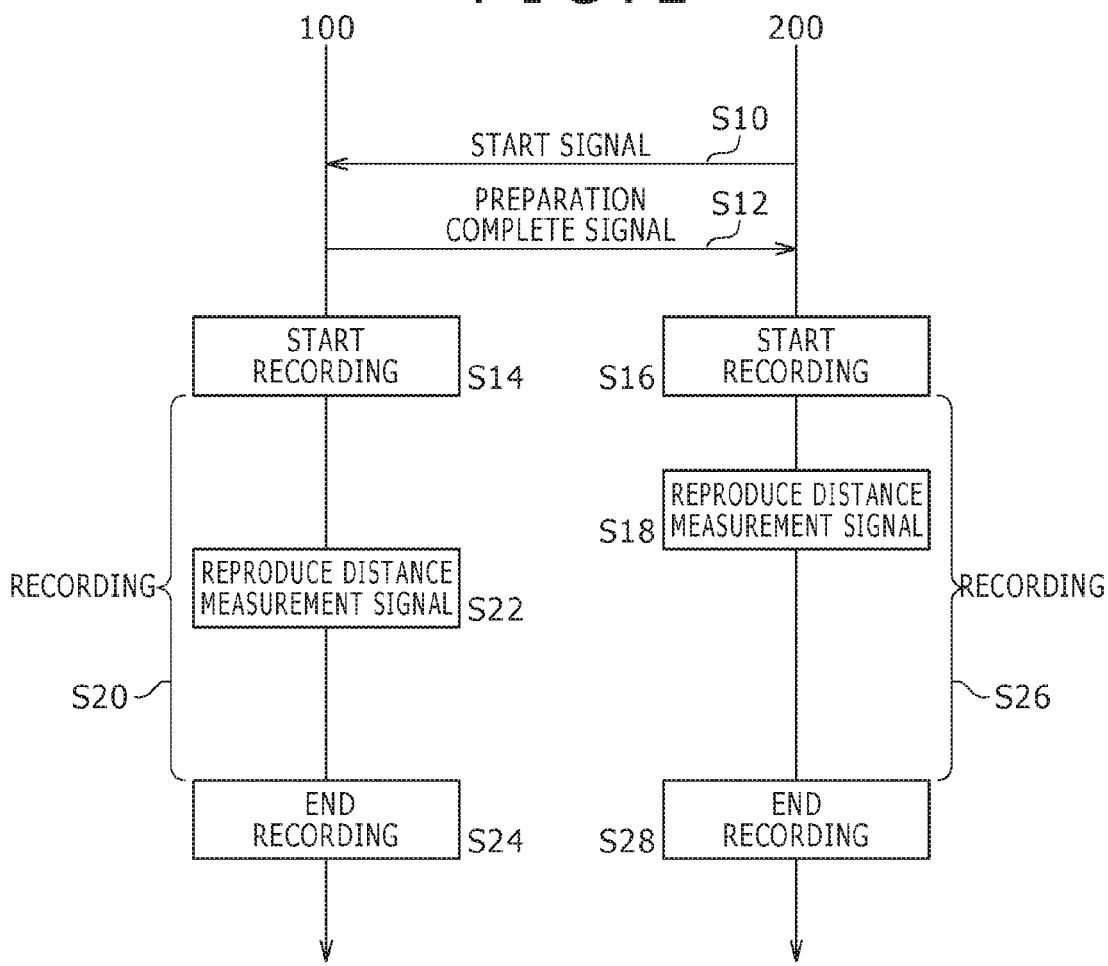
FIG. 2 is a diagram describing a flow of sonic distance measurement that takes place between a wearable terminal and a smartphone.

FIG. 2 is a diagram describing a flow of sonic distance measurement that takes place between the wearable terminal 100 and the smartphone 200.

First, the smartphone 200 transmits a "start signal" to the wearable terminal 100 through wireless data communication (S10). In response to the "start signal" from the smartphone 200, the wearable terminal 100 returns a "preparation complete signal" to the smartphone 200 through wireless data communication (S12), simultaneously starting recording (S14).

In response to the "preparation complete signal," the smartphone 200 starts recording (S16), immediately reproducing a distance measurement signal (S18).

The wearable terminal 100 records the distance measurement signal from the smartphone 200 (S20), reproducing the distance measurement signal (S22) while still in recording condition and terminating recording after elapse of a given period of time (S24).

The smartphone 200 records the distance measurement signal from the wearable terminal 100 (S26), terminating recording after elapse of a given period of time (S28).

Figure 3:
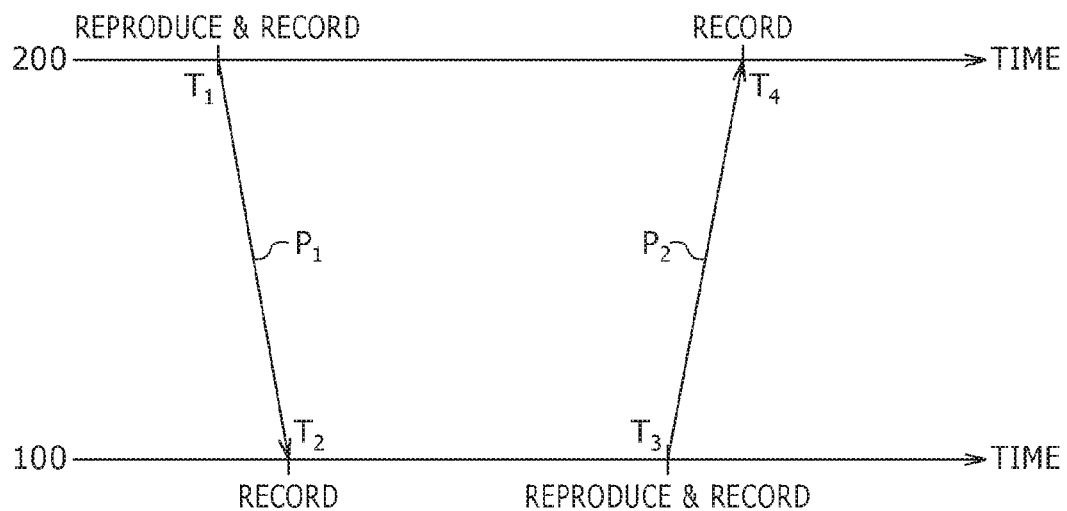
FIG. 3 is a diagram describing, with a timing diagram, reproducing and recording processing of distance measurement signals that takes place in the wearable terminal and the smartphone.

FIG. 3 is a diagram describing, with a timing diagram, reproducing and recording of distance measurement signals that takes place in the wearable terminal 100 and the smartphone 200.

The smartphone 200 reproduces and records a first distance measurement signal sound $P_1$ from time $T_1$, and the wearable terminal 100 reproduces and records the first distance measurement signal sound $P_1$ from the smartphone 200 from time $T_2$. On the other hand, the wearable terminal 100 reproduces and records a second distance measurement signal sound $P_2$ from time $T_3$, and the smartphone 200 records the second distance measurement signal sound $P_2$ from the wearable terminal 100 from time $T_4$.

A time difference $(T_2-T_1)$ is time necessary for the first distance measurement signal sound $P_1$ from the smartphone 200 (outbound signal) to travel the distance d between the smartphone 200 and the wearable terminal 100, whereas a time difference $(T_4-T_3)$ is time necessary for the second distance measurement signal sound $P_2$ (inbound signal) from the wearable terminal 100 to travel the distance d.

A propagation time TOF (time of flight) necessary for a distance measurement signal to travel the distance d between the wearable terminal 100 and the smartphone 200 can be expressed by the following formulas:

$$TOF = ((T_4 - T_3) + (T_2 - T_1))/2 \quad (1)$$

$$= ((T_4 - T_1) - (T_3 - T_2))/2 \quad (2)$$

The distance d between the wearable terminal 100 and the smartphone 200 can be found by multiplying the TOF by the speed of sound traveling through air.

$$d = TOF \times \text{Speed of Sound} \quad (3)$$

In Formula (2) for finding the propagation time TOF, a time difference $(T_4-T_1)$ is obtained by subtracting time $T_1$, the time when recording of the first distance measurement signal sound $P_1$ starts on the smartphone 200, from time $T_4$, the time when recording of the second distance measurement signal sound $P_2$ starts on the smartphone 200. A time difference $(T_3-T_2)$ is obtained by subtracting time $T_2$, the time when recording of the first distance measurement signal sound $P_1$ starts on the wearable terminal 100, from time $T_3$, the time when recording of the second distance measurement signal sound $P_2$ starts on the wearable terminal 100. The former can be measured on the smartphone 200 and the latter by the wearable terminal 100 independently of each other. This provides an advantage in that it is not necessary to synchronize the wearable terminal 100 and the smartphone 200 in time. By transmitting, to the smartphone 200, information about the time difference $(T_3-T_2)$ measured by the wearable terminal 100, it is possible for the smartphone 200 to find the propagation time TOF by using Formula (2).

A chirp signal is used as a distance measurement signal. A chirp signal refers, in general, to a signal whose frequency varies continuously with time. Here, a signal which increases in frequency from 4000 Hz to 10000 Hz and then decreases from 10000 Hz to 4000 Hz with time is used as a distance measurement signal. This contributes to a wider frequency spectrum for the distance measurement signal, thus providing improved noise immunity.

If the sampling rate of the distance measurement signal sound is 48 KHz, the measurement resolution is 7 mm or so because the speed of sound at room temperature is approximately 340 meters per second.

Figure 4:
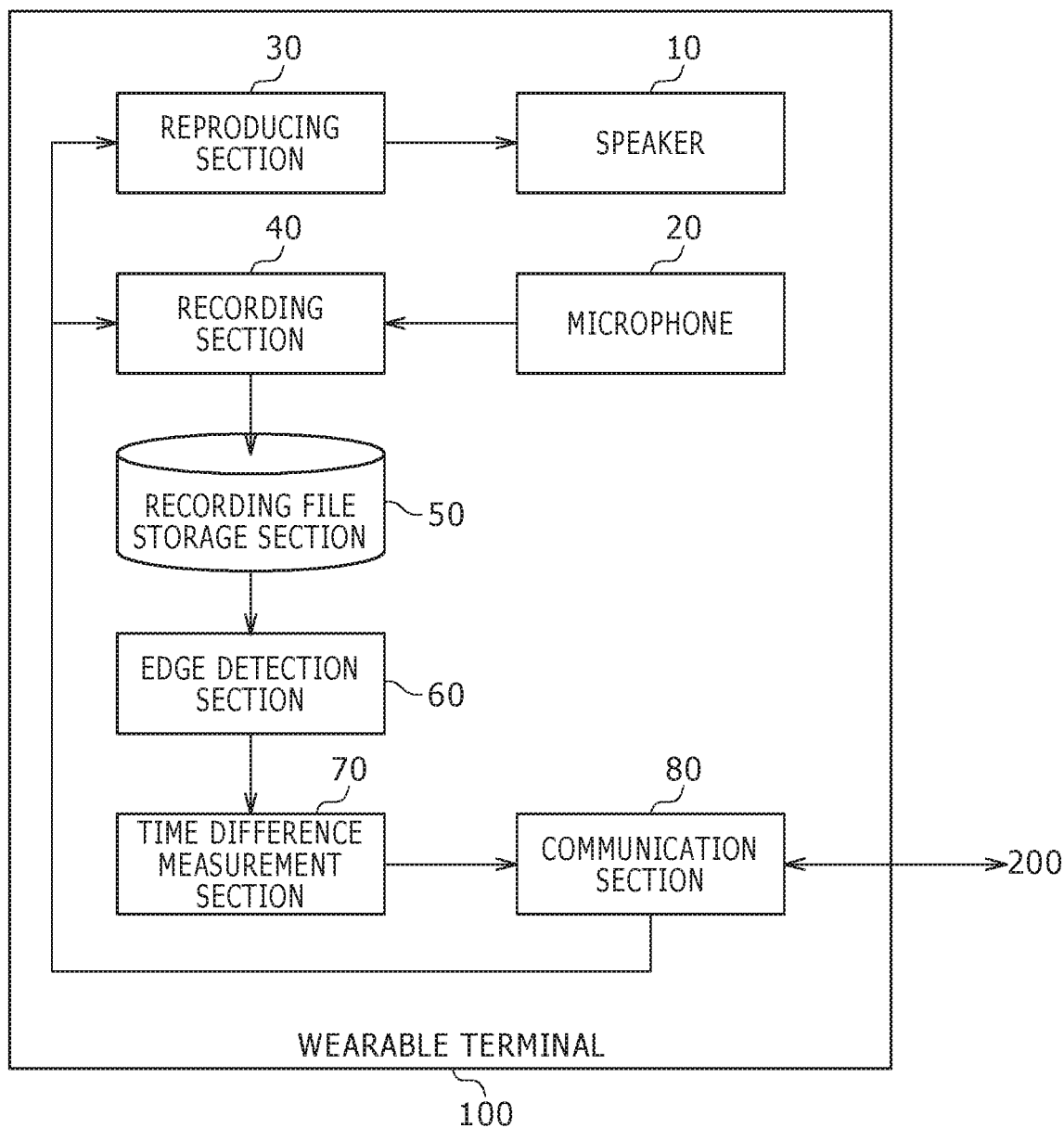
FIG. 4 is a functional configuration diagram of the wearable terminal.

FIG. 4 is a functional configuration diagram of the wearable terminal 100. The wearable terminal 100 includes a speaker 10, a microphone 20, a reproducing section 30, a recording section 40, a recording file storage section 50, an edge detection section 60, a time difference measurement section 70, and a communication section 80. Ordinary functional components of the wearable terminal 100 not directly related to the sonic distance measurement function are not depicted here.

The communication section 80 communicates wirelessly with the smartphone 200 to exchange necessary data. The communication section 80 receives a "start signal" for sonic distance measurement from the smartphone 200, returning a "preparation complete signal" to the smartphone 200. After transmitting the "preparation complete signal," the communication section 80 instructs the reproducing section 30 and the recording section 40 to reproduce and record a distance measurement signal, respectively.

The reproducing section 30 reproduces a distance measurement signal in a given frequency band, and the speaker 10 outputs the distance measurement signal. The microphone 20 of the wearable terminal 100 collects both the sound of its own distance measurement signal that has been output from the speaker 10 and that of the distance measurement signal that has been output from the smartphone 200 and has propagated to the wearable terminal 100. The recording section 40 records the distance measurement signal sounds supplied to the microphone 20 to the recording file storage section 50.

The edge detection section 60 detects the edges of the envelope of the sound waves of the distance measurement signal recorded in the recording file storage section 50, thus measuring two recording start times, i.e., the recording start time $T_2$ of the first distance measurement signal sound $P_1$ that has been output from the smartphone 200 and has propagated to the wearable terminal 100 and the recording start time $T_3$ of the second distance measurement signal sound $P_2$ that has been output from the wearable terminal 100. These two recording start times $T_2$ and $T_3$ are obtained with the accuracy of the signal sampling period of the wearable terminal 100.

The time difference measurement section 70 measures the difference $(T_3-T_2)$ between the recording start time $T_3$ of the second distance measurement signal sound $P_2$ and the recording start time $T_2$ of the first distance measurement signal sound $P_1$ detected by the edge detection section 60. The communication section 80 transmits, to the smartphone 200, the difference $(T_3-T_2)$ between the two recording start times of the distance measurement signals measured by the time difference measurement section 70.

Figure 5:
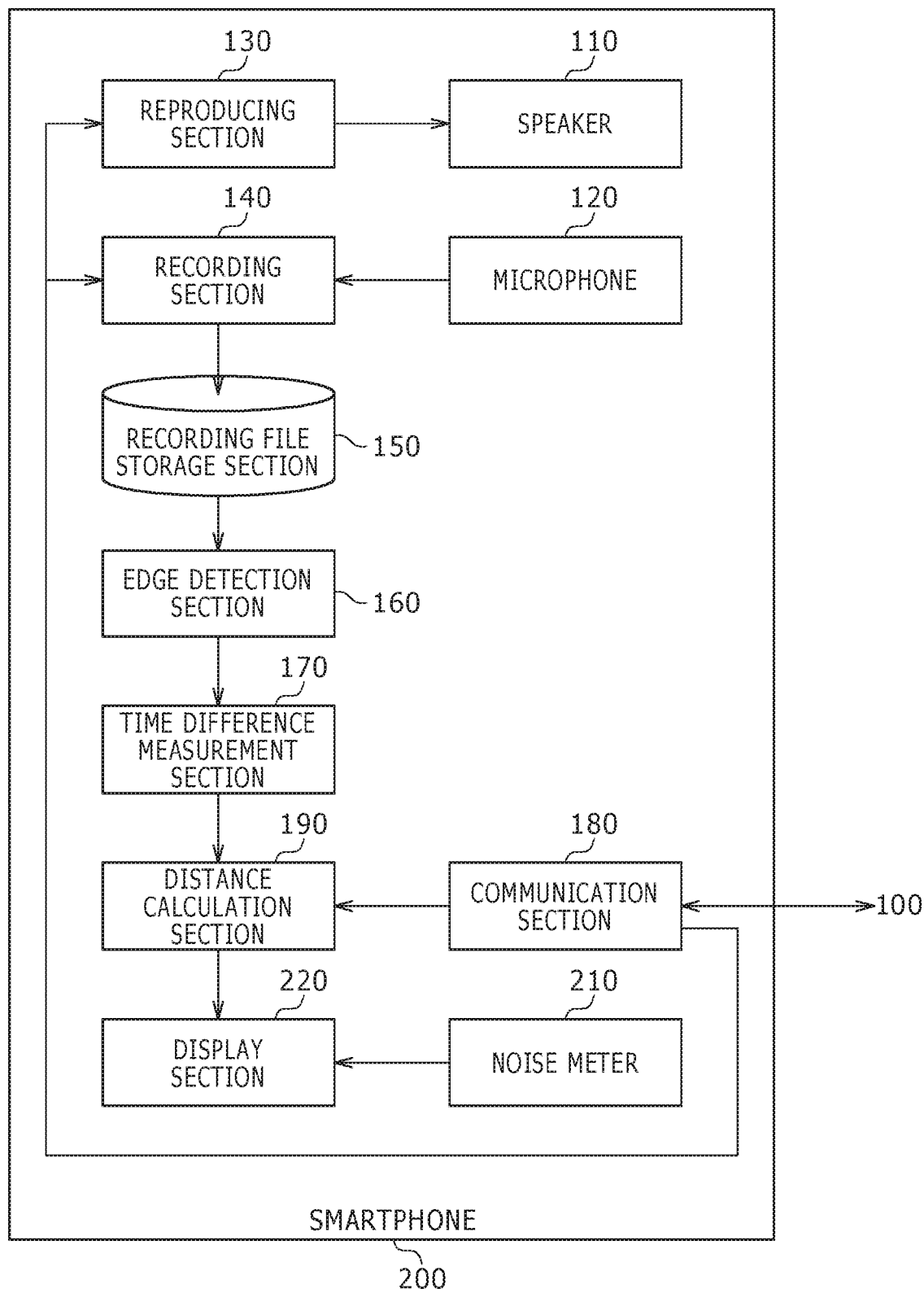
FIG. 5 is a functional configuration diagram of the smartphone.

FIG. 5 is a functional configuration diagram of the smartphone 200. The smartphone 200 includes the speaker 110, the microphone 120, a reproducing section 130, a recording section 140, a recording file storage section 150, an edge detection section 160, a time difference measurement section 170, a communication section 180, a distance calculation section 190, a noise meter 210, and a display section 220. Other ordinary functional components not directly related to the sonic distance measurement function are not depicted here.

The communication section 180 communicates wirelessly with the wearable terminal 100 to exchange necessary data. The communication section 180 transmits a "start signal" for sonic distance measurement to the wearable terminal 100, receiving a "preparation complete signal" from the wearable terminal 100. After receiving the "preparation complete signal," the communication section 180 instructs the reproducing section 130 and the recording section 140 to reproduce and record a distance measurement signal, respectively.

The reproducing section 130 reproduces a distance measurement signal in a given frequency band, and the speaker 110 outputs the distance measurement signal. The microphone 120 of the smartphone 200 collects both the sound of its own distance measurement signal that has been output from the speaker 110 and that of the distance measurement signal that has been output from the wearable terminal 100 and has propagated to the smartphone 200. The recording section 140 records the distance measurement signal sounds supplied to the microphone 120 to the recording file storage section 150.

The edge detection section 160 detects the edges of the envelope of the sound waves of the distance measurement signal recorded in the recording file storage section 150, thus measuring two recording start times, i.e., the recording start time $T_1$ of the first distance measurement signal sound $P_1$ that has been output from the smartphone 200 and the recording start time $T_4$ of the second distance measurement signal sound $P_2$ that has been output from the wearable terminal 100 and has propagated to the smartphone 200. These two recording start times $T_1$ and $T_4$ are obtained with the accuracy of the signal sampling period of the smartphone 200.

The time difference measurement section 170 measures the difference $(T_4-T_1)$ between the recording start time $T_4$ of the second distance measurement signal sound $P_2$ and the recording start time $T_1$ of the first distance measurement signal sound $P_1$ detected by the edge detection section 160. The communication section 180 receives, from the wearable terminal 100, the difference $(T_3-T_2)$ between the recording start time $T_3$ of the second distance measurement signal sound $P_2$ and the recording start time $T_2$ of the first distance measurement signal sound $P_1$.

The distance calculation section 190 calculates the propagation time TOF as indicated by Formula (2) by subtracting the difference $(T_3-T_2)$ between the recording start time $T_3$ of the second distance measurement signal sound $P_2$ and the recording start time $T_2$ of the first distance measurement signal sound $P_1$ from the difference $(T_4-T_1)$ between the recording start time $T_4$ of the second distance measurement signal sound $P_2$ and the recording start time $T_1$ of the first distance measurement signal sound $P_1$ first and then dividing the subtraction result by two. Then, the distance calculation section 190 calculates the distance d between the smartphone 200 and the wearable terminal 100 as represented by Formula (3) by multiplying the propagation time TOF by the speed of sound in air.

The display section 220 displays the distance d, calculated by the distance calculation section 190, on the display of the smartphone 200. The noise meter 210 measures the surrounding environmental noise, giving a noise level index to the display section 220. The display section 220 displays the noise level and, at the same time, indicates that sonic distance measurement is difficult to conduct until the noise level falls down to a given threshold or less.

Figure 6A:
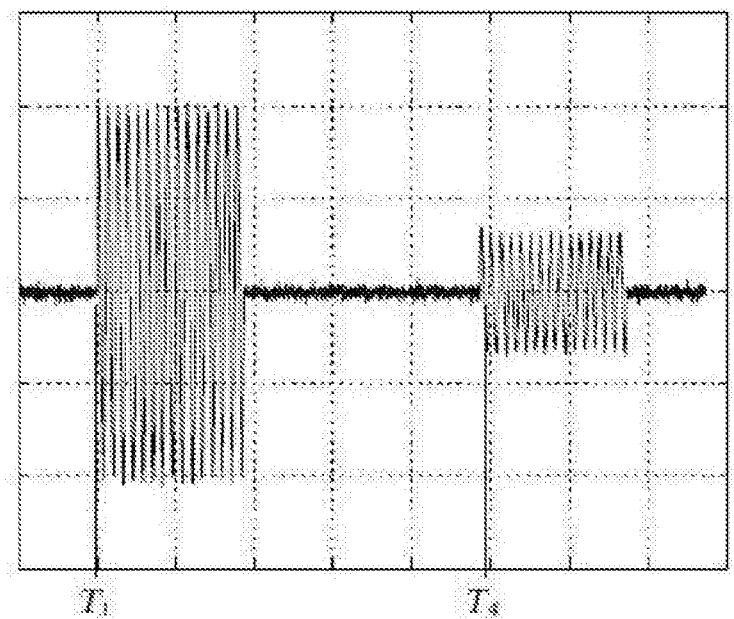
FIG. 6A is a graph illustrating a waveform of a distance measurement signal recorded by the smartphone.
Figure 6B:
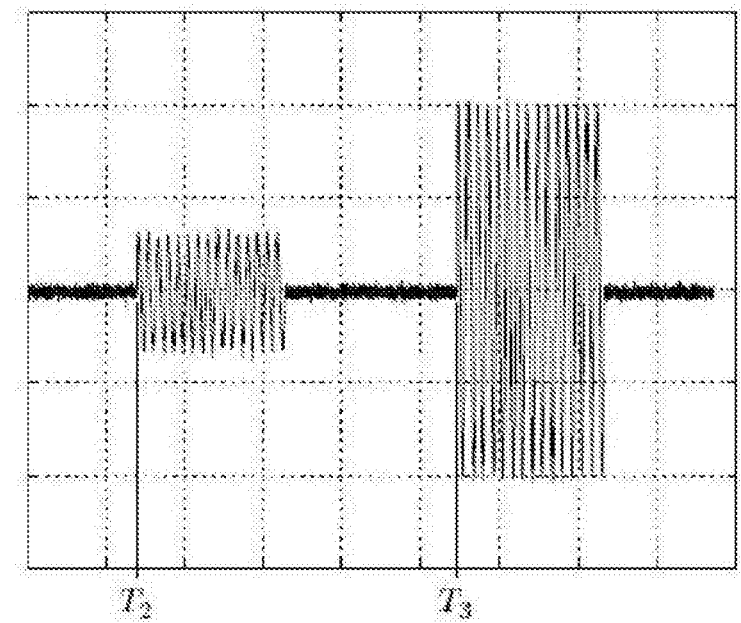
FIG. 6B is a graph illustrating a waveform of a distance measurement signal recorded by the wearable terminal.

FIG. 6A is a graph illustrating a waveform of a distance measurement signal recorded by the smartphone 200, and FIG. 6B is a graph illustrating a waveform of a distance measurement signal recorded by the wearable terminal 100. The horizontal axis represents the time, and the vertical axis the signal amplitude. The sound wave of the distance measurement signal output from the own terminal and that which has propagated from the counterpart terminal are recorded. If the distance measurement signals are equal in volume, the sound reproduced by the own terminal is recorded at a larger volume than the sound that has propagated from the counterpart terminal.

As illustrated in FIG. 6A, the smartphone 200 starts recording the first distance measurement signal sound $P_1$ reproduced by itself at time $T_1$. The smartphone 200 simultaneously reproduces and records the first distance measurement signal sound $P_1$. The smartphone 200 detects the recording start time $T_1$ from the waveform of the first distance measurement signal sound $P_1$ that has been recorded rather than recording the reproducing start time of the first distance measurement signal sound $P_1$. The reason for this is that there may be a time lag, albeit short, between when the first distance measurement signal sound $P_1$ begins to be reproduced and when the first distance measurement signal sound $P_1$ begins to be recorded during a period of time from the start of reproducing of the signal sound to the actual output of the sound and its recording because of the time scheduling of the operating system of the smartphone 200. Then, the smartphone 200 begins to record the second distance measurement signal sound $P_2$ reproduced by the wearable terminal 100 at time $T_4$.

As illustrated in FIG. 6B, the wearable terminal 100 begins to record the first distance measurement signal sound $P_1$ reproduced by the smartphone 200 at time $T_2$. Then, the wearable terminal 100 begins to record the second distance measurement signal sound $P_2$ reproduced by itself at time $T_3$. Similarly here, the wearable terminal 100 simultaneously reproduces and records the second distance measurement signal sound $P_2$. However, the wearable terminal 100 detects the recording start time $T_3$ from the waveform of the second distance measurement signal sound $P_2$ that has been recorded rather than recording the reproducing start time of the second distance measurement signal sound $P_2$. The reason for this is to acquire the accurate recording start time $T_3$ without being affected by the time scheduling of the operating system of the wearable terminal 100.

Here, the times $T_1$, $T_2$, $T_3$, and $T_4$ can be detected by extracting leading edges of sound waveforms recorded as a recording file. Leading edges can be extracted, for example, by detecting the envelope of such sound waves. Using sound wave data that has been actually reproduced and recorded as described above allows for accurate time measurement in a manner independent of the time schedule of the operating system of the wearable terminal 100 and the smartphone 200.

Figure 7A:
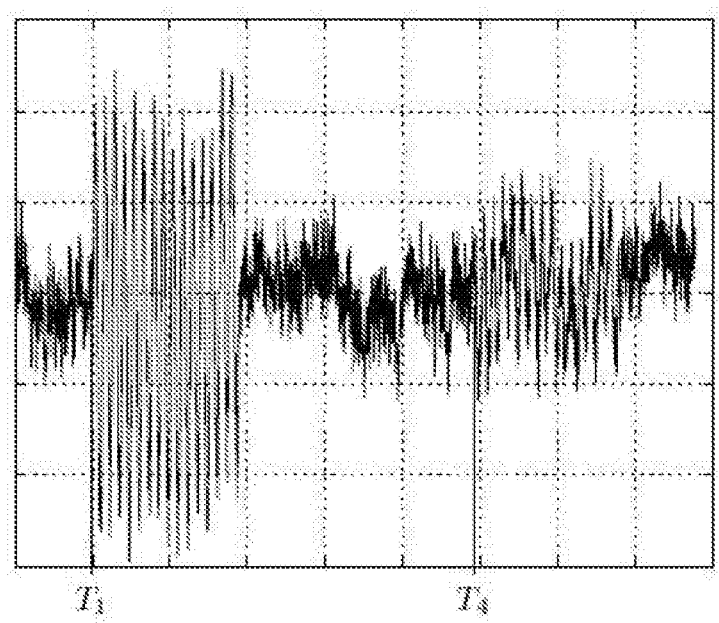
FIG. 7A is a graph illustrating a waveform of a distance measurement signal recorded by the smartphone in a noise-exposed environment.
Figure 7B:
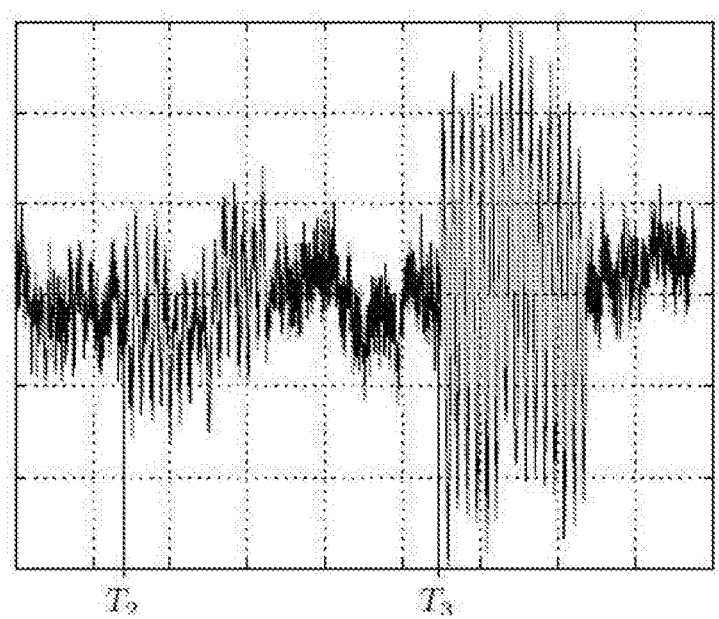
FIG. 7B is a graph illustrating a waveform of a distance measurement signal recorded by the wearable terminal in a noise-exposed environment.

In the presence of noise in the environment of interest during distance measurement using distance measurement signal sound, noise adds to the distance measurement signal sound, possibly making accurate distance measurement difficult or leading to an erroneous distance measurement result. FIG. 7A is a graph illustrating a waveform of a distance measurement signal sound recorded by the smartphone 200 in a noise-exposed environment. FIG. 7B is a graph illustrating a waveform of a distance measurement signal sound recorded by the wearable terminal 100 in a noise-exposed environment.

As illustrated in FIGS. 7A and 7B, a reproduced distance measurement signal is recorded with noise added thereto in a noise-exposed environment. Further, noise is recorded even during a period of time in which no distance measurement signal is reproduced, rendering the edges of the sound waves of the distance measurement signals unclear and making it difficult to accurately detect the recording start times $T_1$, $T_2$, $T_3$, and $T_4$ as leading edges of distance measurement signals. As a result, it may become difficult to calculate the propagation time TOF of a distance measurement signal sound, or the wrong TOF may be calculated. For this reason, it is important, before conducting sonic distance measurement, to measure the surrounding noise level so as to determine whether or not sonic distance measurement can be conducted with accuracy.

Figure 8:
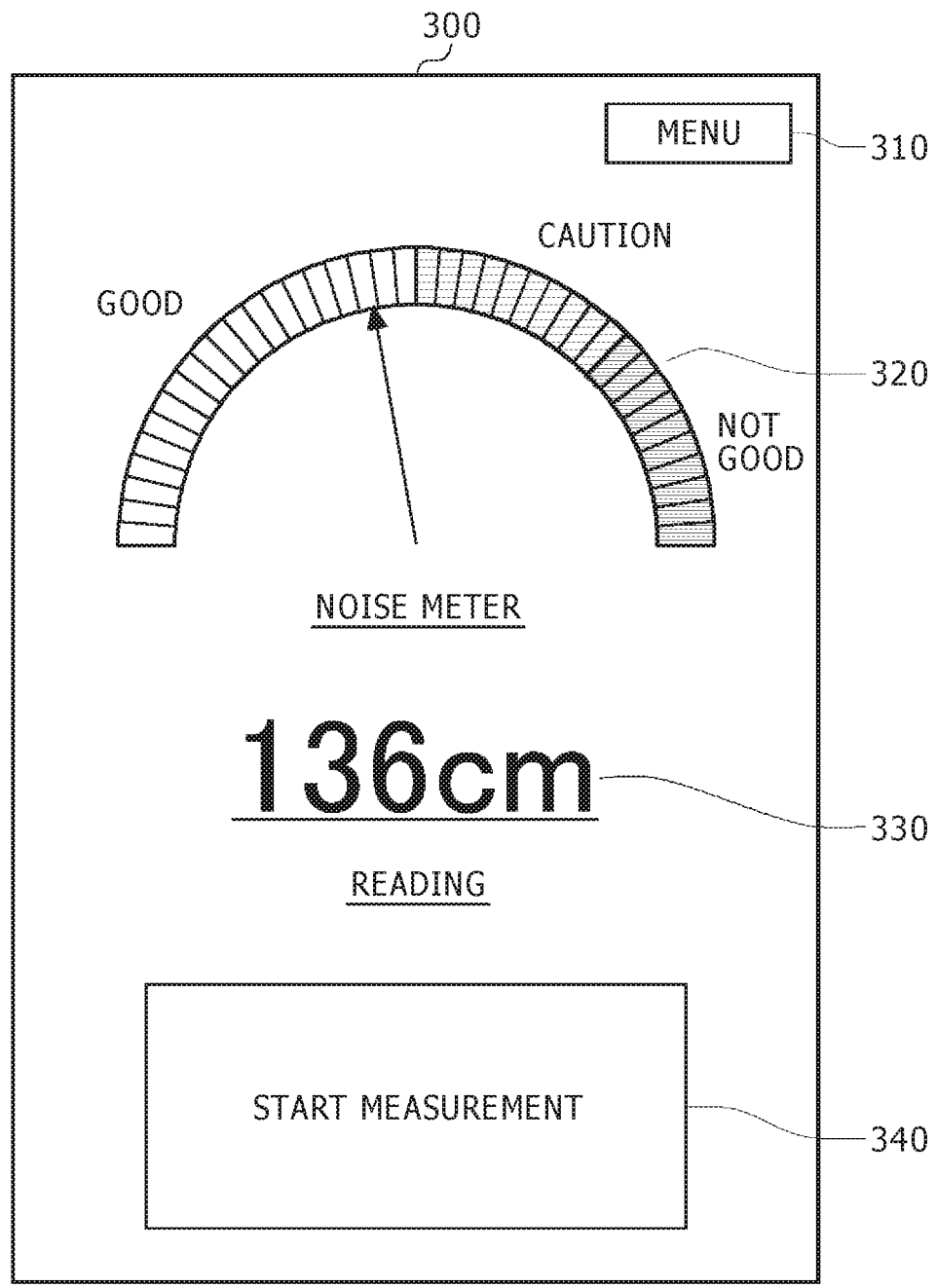
FIG. 8 is a diagram describing a smartphone screen.

FIG. 8 is a diagram describing a screen 300 of the smartphone 200. A menu 310 is an operation button for depicting a menu screen of a sonic distance measurement application. A sound meter 320 displays the noise level of the surrounding environment for distance measurement. "Good" indicates that distance measurement is possible with no problems. "Caution" indicates that this noise level may lead to a wrong distance measurement result. "Not good" indicates that the noise level is not suitable for distance measurement.

It should be noted that the quantitative range of each noise level depends upon factors such as distance measurement signal sound and performance of the speakers and the microphone. It is, therefore, appropriate to define the range experimentally.

FIG. 8 illustrates that the noise level of the sound meter 320 is "good." The user can start sonic distance measurement by pressing a "start measurement" button 340. The measured distance appears as a reading 330. Here, "136 cm" appears.

Figure 9:
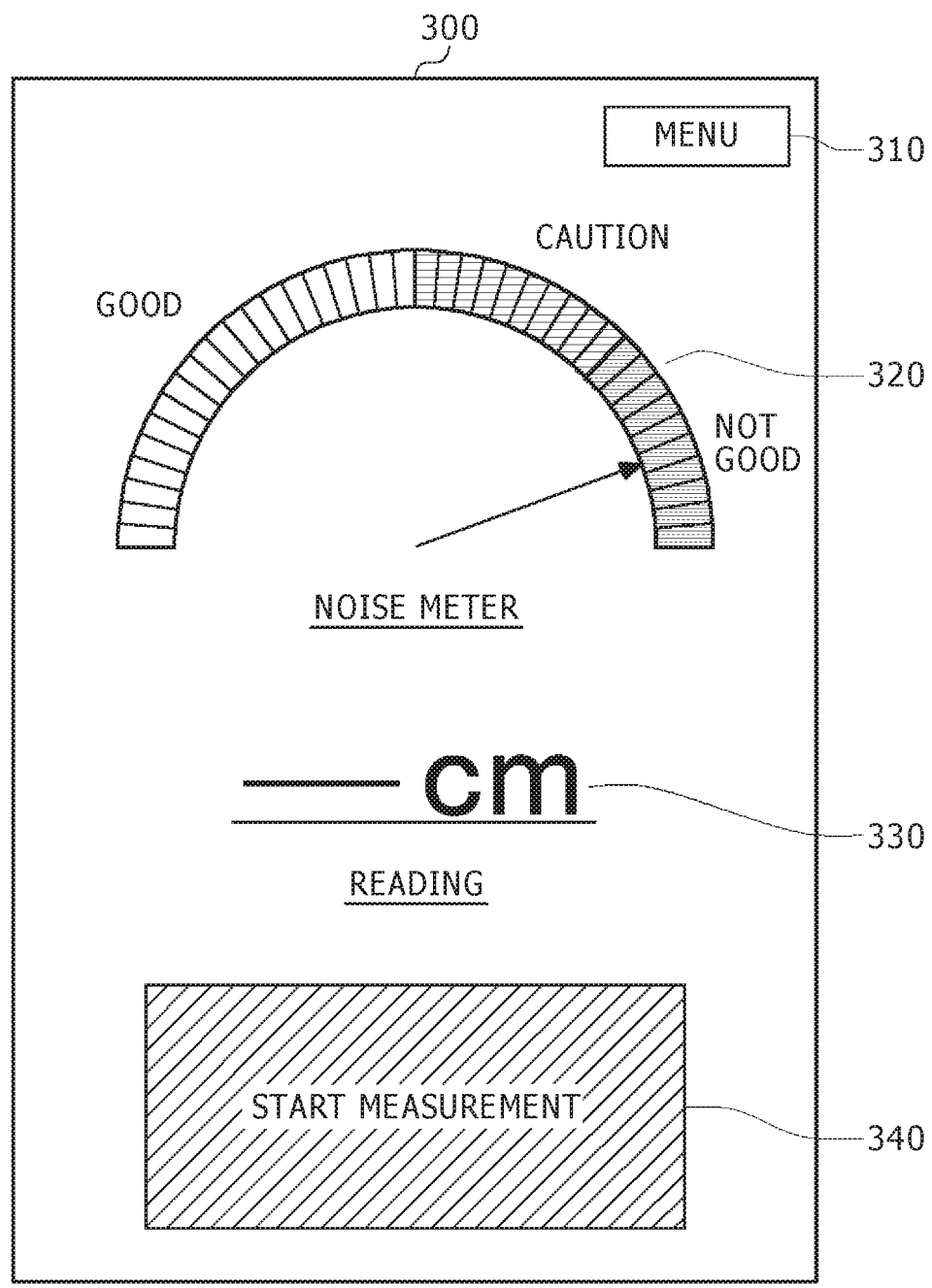
FIG. 9 is a diagram describing a smartphone screen in a noise-exposed environment.

FIG. 9 is a diagram describing the screen 300 of the smartphone 200 in a noise-exposed environment. FIG. 9 illustrates that the noise level of the sound meter 320 is "not good." As a result, the "start measurement" button 340 grays out, making it difficult for the user to manipulate the "start measurement" button 340. Distance measurement is difficult in this condition.

The user may choose to wait until the surrounding noise condition improves using the noise meter and then proceed with distance measurement. For example, if distance measurement is conducted along a street with intense traffic, it is preferred to wait until the street becomes quiet and then proceed with distance measurement. In this case, "measurement mode programming" is conducted.

Figure 10:
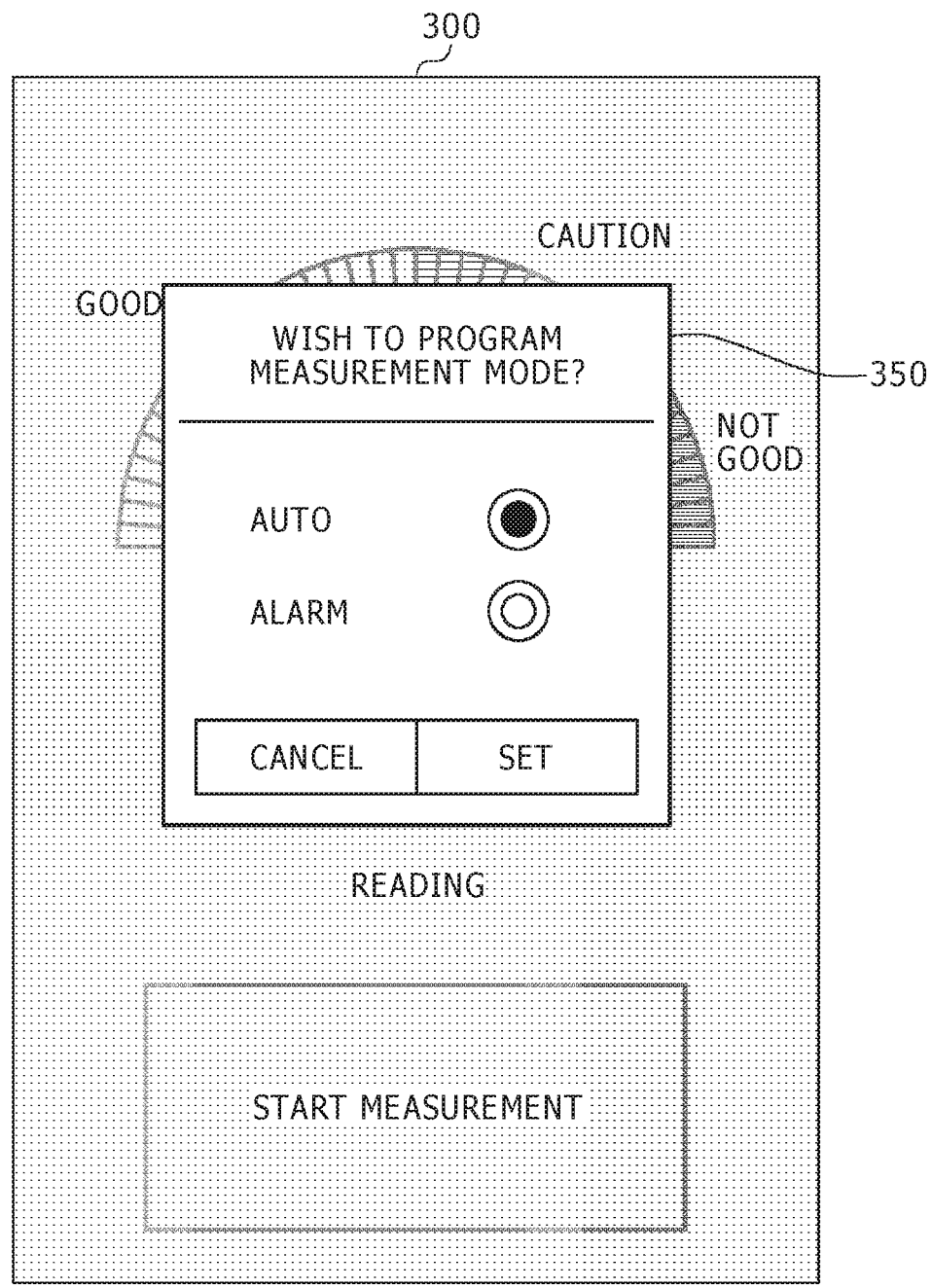
FIG. 10 is a diagram describing a smartphone screen during measurement mode programming.

FIG. 10 is a diagram describing the screen 300 of the smartphone 200 during measurement mode programming. FIG. 10 illustrates that the noise level of the sound meter 320 is "not good." If it is difficult to conduct distance measurement, a dialog box 350 appears to prompt the user to program a measurement mode when he or she manipulates the menu 310.

There are two options for measurement mode programming, that is, (1) "auto" mode and (2) "alarm" mode. In "auto" mode, distance measurement is conducted automatically when the noise level declines. In "alarm" mode, an alarm tone sounds when the noise level declines. The user selects one of the two modes and presses the "set" button to program that measurement mode. In the case of auto mode, distance measurement begins automatically when the noise level improves to "good" or "caution," thus indicating a measurement result. In the case of alarm mode, the alarm notifies the user that distance measurement is possible when the noise level improves to "good" or "caution." The user starts distance measurement by pressing the "start measurement" button 340.

Figure 11:
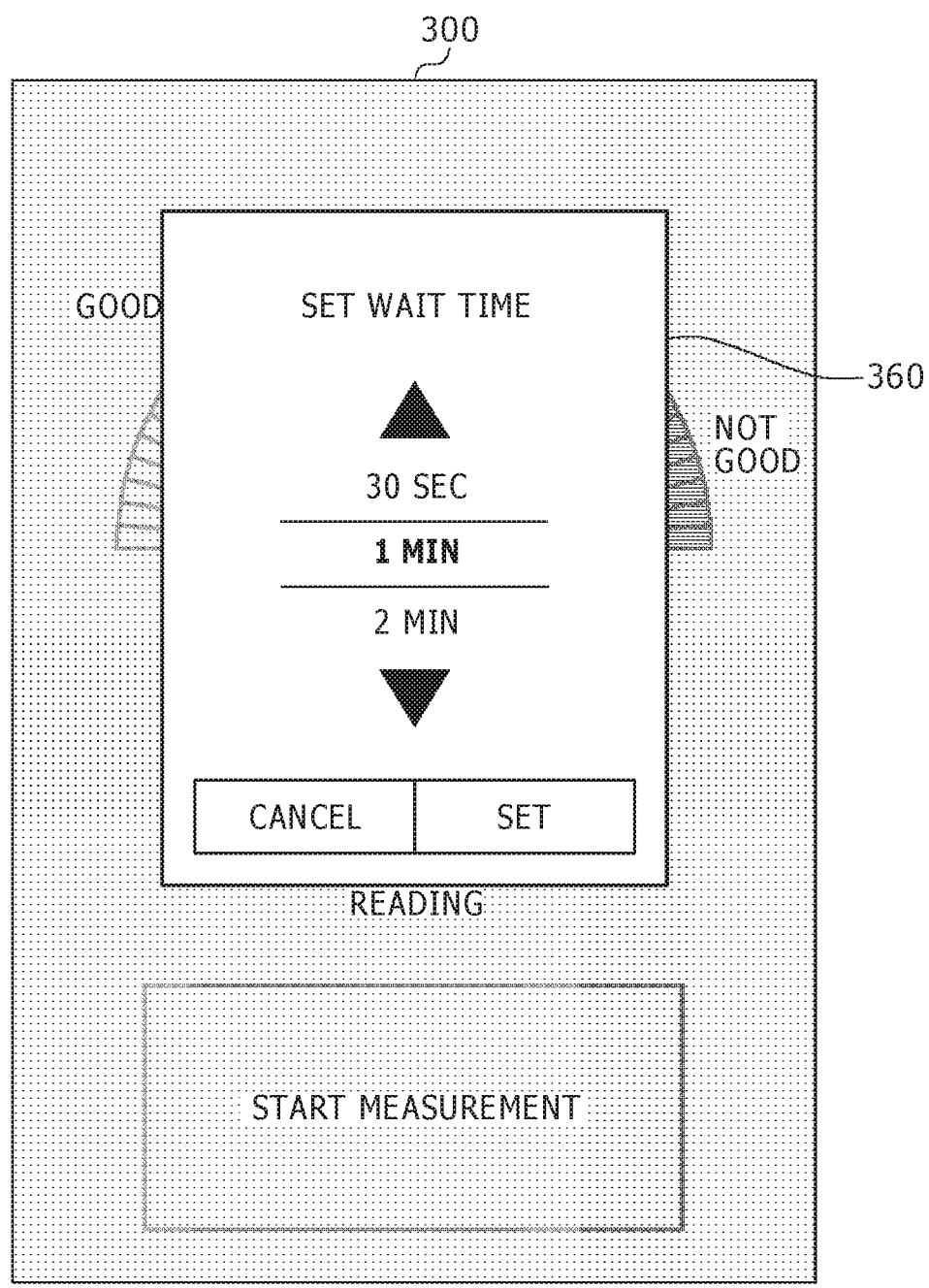
FIG. 11 is a diagram describing a smartphone screen when a wait time is specified during measurement mode programming.

FIG. 11 is a diagram describing the screen 300 of the smartphone 200 when a wait time is specified during measurement mode programming. Irrespective of whether auto mode or alarm mode is programmed during measurement mode programming, it is not known when distance measurement begins. Therefore, it is necessary for the user to continue to stand by at an end point of the target to be measured while holding the smartphone 200. It is inconvenient for the user because he or she does not know how long he or she should wait. For this reason, the user can also specify a "wait time" on a dialog box 360 that appears during measurement mode programming. Wait time is 30 seconds, one minute, two minutes, and so on. If distance measurement is not conducted because the noise level does not decline within the set wait time, an alarm tone sounds, thus notifying the user that time is up.

Figure 12:
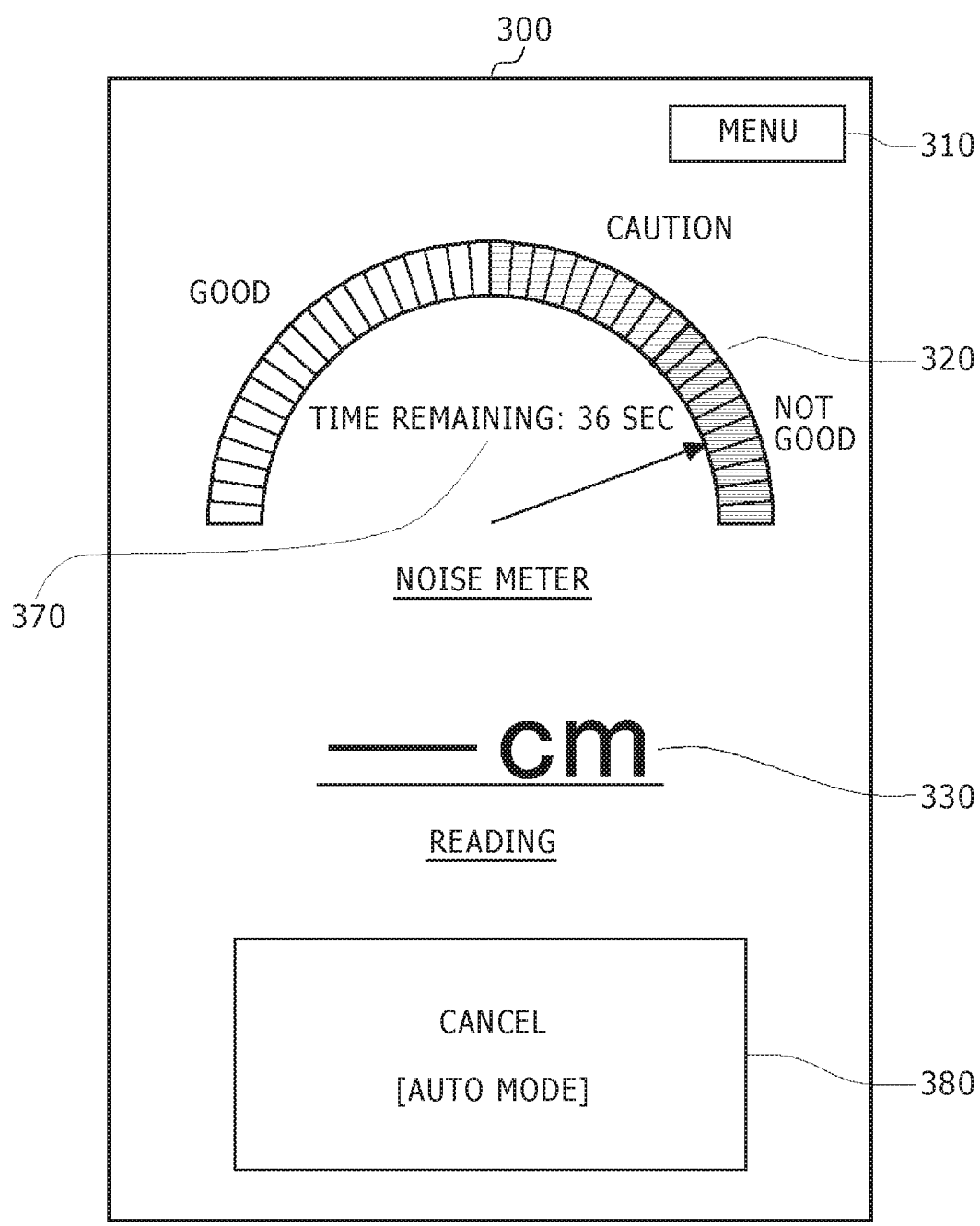
FIG. 12 is a diagram describing a smartphone screen in auto mode.

FIG. 12 is a diagram describing the screen 300 of the smartphone 200 in auto mode. A time remaining 370 of the wait time set on the dialog box 360 depicted in FIG. 11 appears. Further, a button 380 appears to cancel auto mode. The user can stop distance measurement by pressing the cancel button 380 even when the set wait time has yet to elapse. Although not described here, a time remaining and a cancel button also appear in alarm mode.

Up to this point, a description has been given of a configuration in which distance measurement is initiated when the noise level falls down to a given threshold or less. A description will be given below of another example of configuration in which distance measurement is rendered possible when the noise level exceeds the given threshold even in a noise-exposed environment by outputting a distance measurement signal that falls outside the frequency band of noise.

Figure 13:
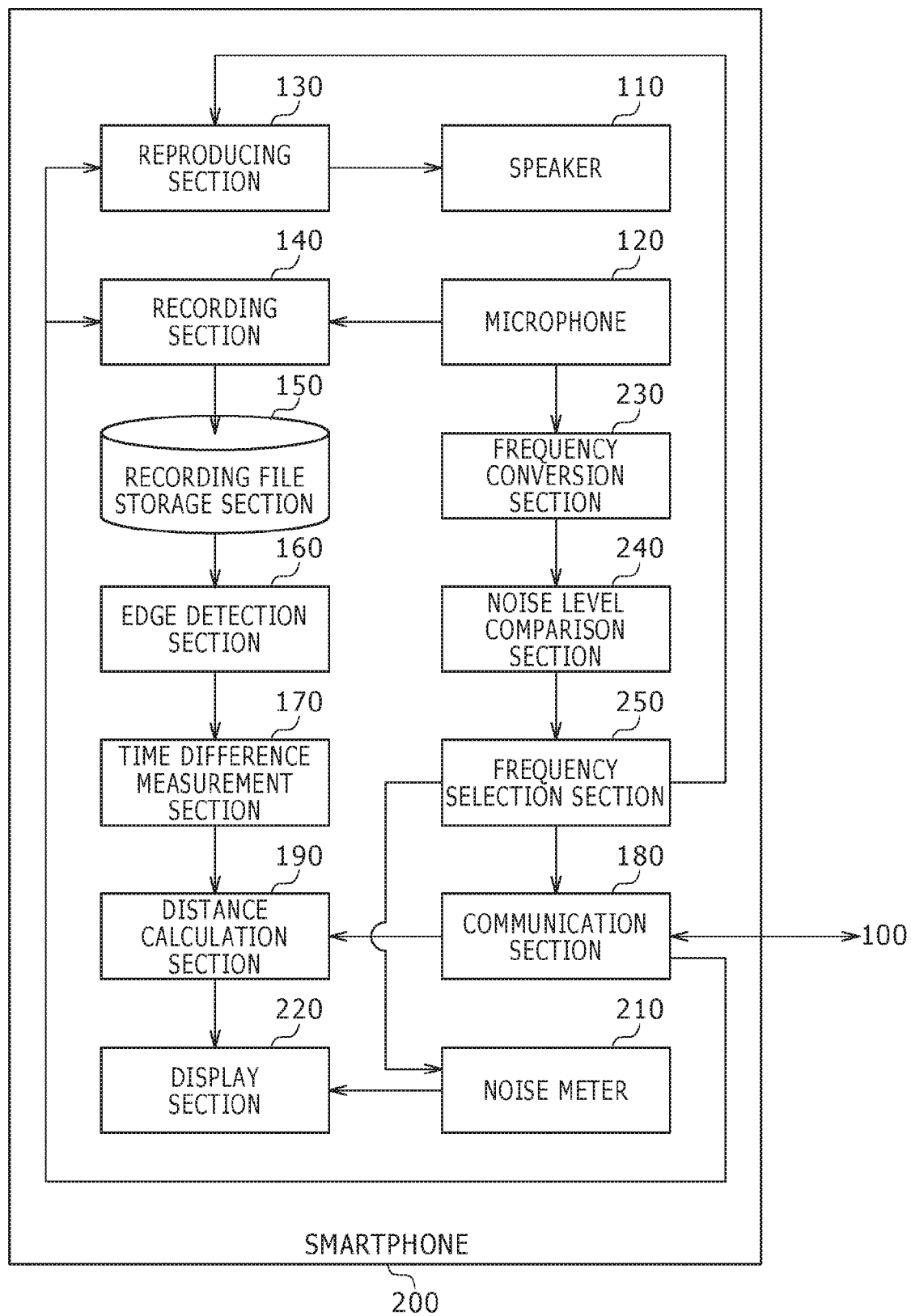
FIG. 13 is a diagram describing a functional configuration diagram of the smartphone.

FIG. 13 is a diagram describing a functional configuration diagram of the smartphone 200. Unlike the functional configuration depicted in FIG. 5, the smartphone 200 further includes a frequency conversion section 230, a noise level comparison section 240, and a frequency selection section 250.

The frequency conversion section 230 converts the environmental sound collected by the microphone 120 into a frequency range, thus detecting a spectrum.

Figure 14:
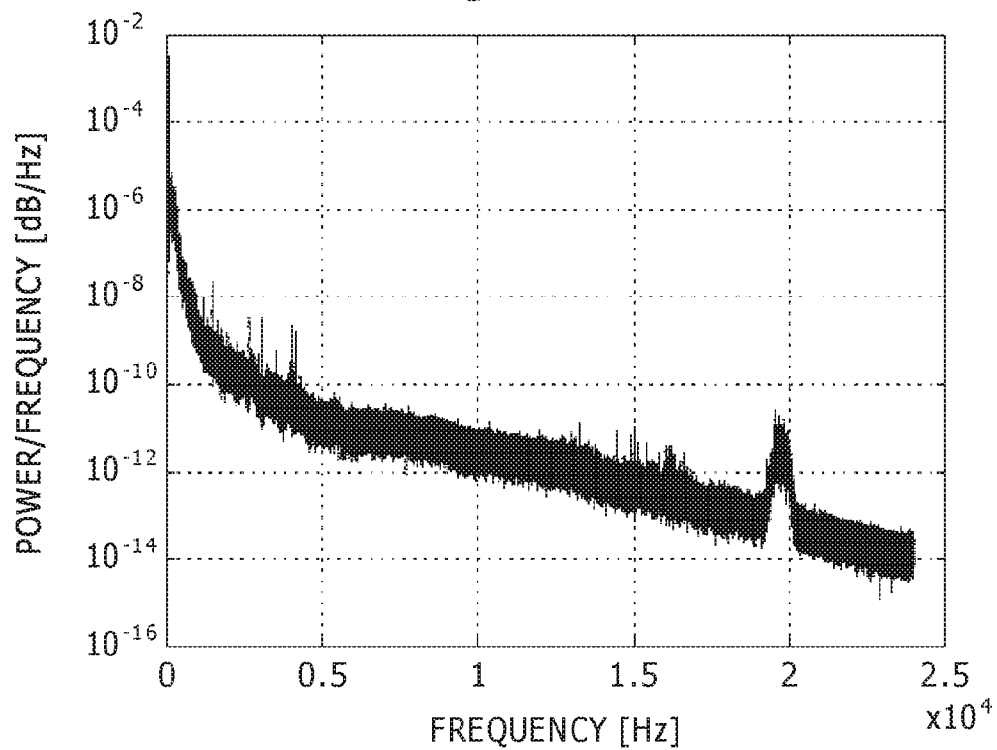
FIG. 14 is a graph illustrating a spectrum of an environmental sound in an aircraft.

FIG. 14 is a graph depicting, as an example, a spectrum of an environmental sound in an aircraft. The horizontal axis represents the frequency, and the vertical axis the amplitude. It is clear in this spectrum that noise having spike-like frequency components is present at 5000 Hz and under, from 13000 to 17000 Hz, and around 20000 Hz. Accurate distance measurement is possible by selecting a frequency band of the distance measurement signal sound that falls outside these frequency bands exposed to noise.

The noise level comparison section 240 acquires, of those spectrum components obtained from the frequency conversion section 230, a frequency strength every 1000 Hz, for example, between 0 and 20 KHz for use as "measurement data."

The frequency selection section 250 compares this "measurement data" against "reference data" specified in advance, selecting a frequency range in which the "measurement data" does not exceed the "reference data" as a distance measurement signal's frequency band and notifying the selected frequency band to the reproducing section 130 and the communication section 180. The reproducing section 130 modifies the distance measurement signal adapted to drive the speaker 110 in accordance with the selected frequency band. For example, the reproducing section 130 generates a distance measurement signal as a chirp signal by continuously varying the frequency in the selected frequency band and skipping the unselected frequency bands in such a manner that the frequency varies discontinuously.

The communication section 180 transmits the selected frequency band to the wearable terminal 100. The reproducing section 30 of the wearable terminal 100 modifies the distance measurement signal adapted to drive the speaker 10 in accordance with the received frequency band.

Figure 15:
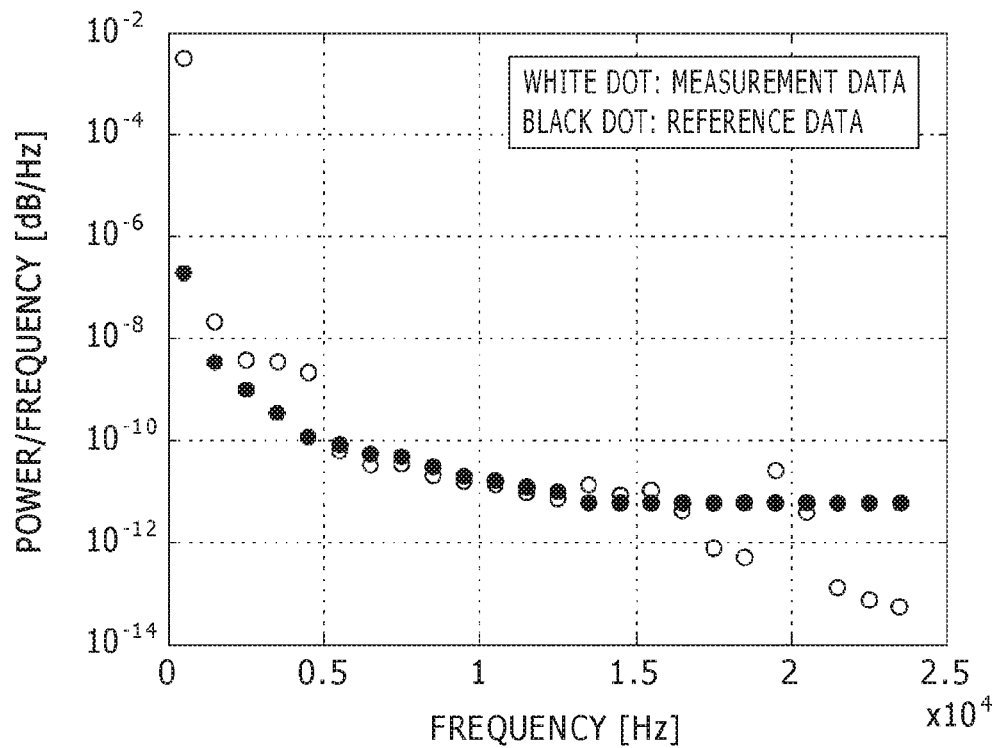
FIG. 15 is a graph illustrating measurement data of an environmental sound and reference data determined in advance.

FIG. 15 is a graph illustrating measurement data of an environmental sound and reference data determined in advance. Measurement data of an environmental sound obtained by the noise level comparison section 240 is represented by white dots. On the other hand, reference data is represented by black dots. Reference data is obtained, for example, in a manner described below. For example, noise is produced in an anechoic chamber or other such room to match each of the frequency bands used for a distance measurement signal, gradually increasing the noise volume. The maximum amount of noise under which distance measurement is possible is defined as reference data. This reference data is affected by the characteristics of the speakers and microphones of the wearable terminal 100 and the smartphone 200. Reference data is stored in the memory of the smartphone 200 as a table.

The frequency selection section 250 notifies, to the noise meter 210, the noise level of the environmental sound in the selected frequency range. The display section 220 displays the noise level read by the noise meter 210 on the screen 300 of the smartphone 200. Even if large noise is present in an unselected frequency range, such noise is not reflected in the noise level of the noise meter 210. The distance measurement signal has been modified to avoid the frequency range exposed to large noise, thus allowing for distance measurement even in the presence of large noise in an unselected frequency range.

Adjusting the orientation of the mobile terminal in view of the directional characteristics of the speaker and the microphone of the mobile terminal is conceivable as further improvement of the above-mentioned sonic distance measurement method. This improved method is described as follows.

In order to ensure improved accuracy in distance measurement, it is preferred to point the speaker and the microphone of the wearable terminal 100 to those of the smartphone 200. The reason for this is that the distance measurement signal sound is directly conveyed between the wearable terminal 100 and those of the smartphone 200, thus preventing reflection of the signal sound by a wall, floor, and so on and permitting accurate distance measurement.

Depending on the type of smartphone, the speakers and the microphone point in different directions. In that case, the speakers should be pointed to the counterpart device because, in general, speakers are directional, and microphones are not.

Figure 16:
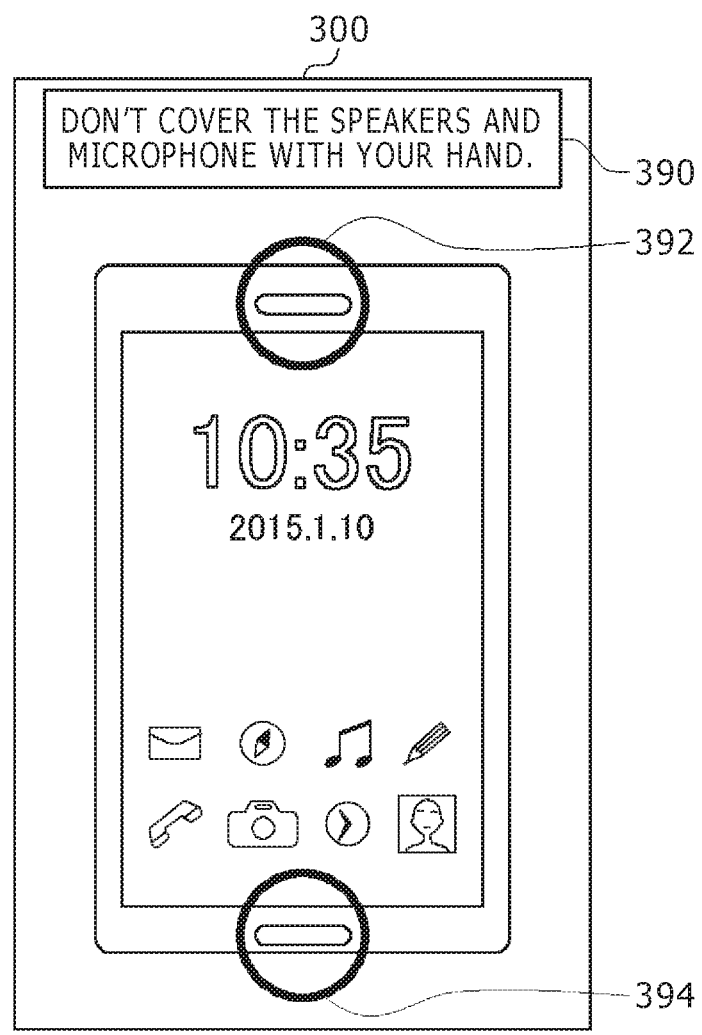
FIG. 16 is a diagram describing a screen illustrating the positions of the speakers and the microphone incorporated in the smartphone.

The following function is introduced to prevent the user from becoming confused as to the orientations of the speakers and the microphone of the smartphone 200. First, when the distance measurement application of the smartphone 200 starts, the screen 300 appears to depict the positions of the speakers and the microphone incorporated in the smartphone 200 as illustrated in FIG. 16. In the smartphone 200 of the present embodiment, the speaker 110 is provided at the top portion of the touch panel surface of the smartphone 200, with the other speaker 110 and the microphone 120 provided at the bottom portion thereof. Therefore, the positions thereof are enclosed in circles as represented by reference numerals 392 and 394. Further, at this time, a message 390 appears to urge the user not to cover the speakers and the microphone of the smartphone 200 with his or her hand.

If the speaker 110 is provided on the rear or side surface of the smartphone 200, it is easy to conduct distance measurement while at the same time manipulating the touch panel surface of the smartphone 200. However, if distance measurement is conducted using the smartphone 200 having the speakers 110 only on the touch panel surface as in the present embodiment, such distance measurement with the speakers 110 of the smartphone 200 pointed to the wearable terminal 100 forces the user to be in an unusual posture. Therefore, if distance measurement is conducted using the smartphone 200 having the speakers 110 on the touch panel surface, distance measurement begins in several seconds after the "start measurement" button 340 is pressed. It is only necessary for the user to point the speakers 110 of the smartphone 200 to the wearable terminal 100 during that period of time.

That is, when the "start measurement" button 340 is pressed, the screen 300 appears to instruct the user to point the speakers 110 of the smartphone 200 to the wearable terminal 100. The screen 300 displays an arrow 410 to indicate the direction in which the smartphone 200 is to be pointed for easy comprehension by the user. Further, at this time, a message 400 saying, for example, "point the screen to the wearable terminal, and distance measurement will begin soon," appears. Distance measurement begins in several seconds after the screen 300 appears. A setting menu similar to that depicted in FIG. 11 can be used to specify how many seconds after the screen 300 appears distance measurement is to be initiated.

Up to this point, a description has been given of the orientations of the speakers and the microphone of the smartphone 200 during distance measurement. However, the orientations of the speaker and the microphone of the wearable terminal 100 are naturally important as well. If the wearable terminal 100 is placed at the far end side of the target to be measured, and if the wearable terminal 100 has a display function with a message appearing thereon, it is difficult for the user at a remote location to read that message. Further, the wearable terminal 100 may have no display function. Therefore, optimal distance measurement may be achieved by using the acceleration sensors and geomagnetic sensors incorporated in the wearable terminal 100 and the smartphone 200.

Figure 18:
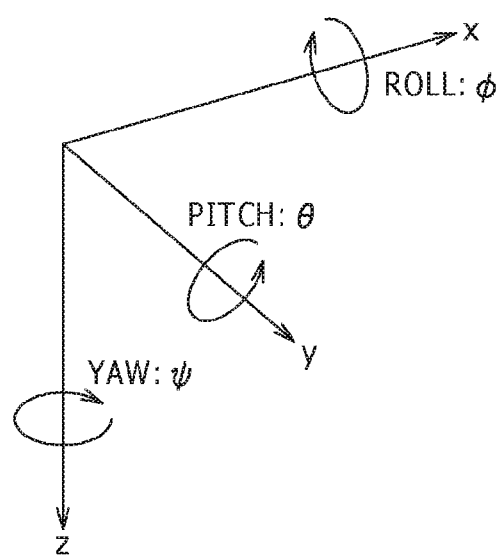
FIG. 18 is a diagram describing a coordinate system that is defined to represent the postures of the wearable terminal and the smartphone.

It is generally known that the posture of a device can be detected by using the acceleration sensor and the geomagnetic sensor incorporated in the device. In order to represent the three-dimensional postures of the wearable terminal 100 and the smartphone 200, a coordinate system is defined as illustrated in FIG. 18. The angle around the x-axis is defined as a roll angle $\phi$, the angle around the y-axis as a pitch angle $\theta$, and the angle around the z-axis as a yaw angle $\varphi$. As for rotation around each axis, the clockwise direction relative to the direction of advance of that axis is "positive."

When each of the devices (wearable terminal 100 and smartphone 200) is at a standstill and placed so that the acceleration sensor incorporated in each device is level, the acceleration sensor detects only a gravitational acceleration g. At this time, an output Gr of the acceleration sensor and an output Br of the geomagnetic sensor are expressed by the formulas represented below.

$$G_r = \begin{pmatrix} 0 \\ 0 \\ g \end{pmatrix}$$

$$B_r = B \begin{pmatrix} \cos\delta \\ 0 \\ \sin\delta \end{pmatrix}$$

Where B is the geomagnetic intensity, and δ is the geomagnetic inclination.

Next, an output Gd of the acceleration sensor and an output Bd of the geomagnetic sensor when the z-, y-, and x-axes are rotated in this condition are expressed by the formulas represented below.

$$G_d = R_x(\phi)R_y(\theta)R_z(\psi)G_r = R_x(\phi)R_y(\theta)R_z(\psi)\begin{pmatrix} 0 \\ 0 \\ g \end{pmatrix} \quad (1)$$

$$B_d = R_x(\phi)R_y(\theta)R_z(\psi)B_r = R_x(\phi)R_y(\theta)R_x(\psi)B\begin{pmatrix} \cos\delta \\ 0 \\ \sin\delta \end{pmatrix} \quad (2)$$

The three rotation matrices used in Formulas (1) and (2) are expressed by the formulas represented below.

$$R_x(\phi) = \begin{pmatrix} 1 & 0 & 0 \\ 0 & \cos\phi & \sin\phi \\ 0 & -\sin\phi & \cos\phi \end{pmatrix} \quad (3)$$

$$R_y(\theta) = \begin{pmatrix} \cos\theta & 0 & -\sin\theta \\ 0 & 1 & 0 \\ \sin\theta & 0 & \cos\theta \end{pmatrix} \quad (4)$$

$$R_z(\psi) = \begin{pmatrix} \cos\psi & \sin\psi & 0 \\ -\sin\psi & \cos\psi & 0 \\ 0 & 0 & 1 \end{pmatrix} \quad (5)$$

The following formula is obtained by multiplying the two sides of Formula (1) by the roll and pitch in the opposite direction.

$$R_y(-\theta)R_x(-\phi)G_d = R_y(-\theta)R_x(-\phi)\begin{pmatrix} G_{dx} \\ G_{dy} \\ G_{dz} \end{pmatrix} = R_z(\psi)\begin{pmatrix} 0 \\ 0 \\ g \end{pmatrix} = \begin{pmatrix} 0 \\ 0 \\ g \end{pmatrix} \quad (6)$$

Here, the output of each of the axes of the acceleration sensor is denoted by the following:

$$G_d = \begin{pmatrix} G_{dx} \\ G_{dy} \\ G_{dz} \end{pmatrix}$$

Then, Formula (6) is expanded as follows:

$$\begin{pmatrix} \cos\theta & 0 & \sin\theta \\ 0 & 1 & 0 \\ -\sin\theta & 0 & \cos\theta \end{pmatrix}\begin{pmatrix} 1 & 0 & 0 \\ 0 & \cos\phi & -\sin\phi \\ 0 & \sin\phi & \cos\phi \end{pmatrix}\begin{pmatrix} G_{dx} \\ G_{dy} \\ G_{dz} \end{pmatrix} = \begin{pmatrix} 0 \\ 0 \\ g \end{pmatrix} \quad (7)$$

$$\begin{pmatrix} \cos\theta & \sin\theta\sin\phi & \sin\theta\cos\phi \\ 0 & \cos\phi & -\sin\phi \\ -\sin\theta & \cos\theta\sin\phi & \cos\theta\cos\phi \end{pmatrix}\begin{pmatrix} G_{dx} \\ G_{dy} \\ G_{dz} \end{pmatrix} = \begin{pmatrix} 0 \\ 0 \\ g \end{pmatrix}$$

Focusing on the y component of Formula (7), we obtain the following formula:

$$G_{dy}\cos\phi - G_{dz}\sin\phi = 0 \quad (8)$$

Solving this formula with respect to φ, we find the following:

$$\phi = \tan^{-1}\left(\frac{G_{dy}}{G_{dz}}\right) \quad (9)$$

Focusing on the x component of Formula (7), we obtain the following formula:

$$G_{dx}\cos\theta + G_{dy}\sin\theta\sin\phi + G_{dz}\sin\theta\cos\phi = 0 \quad (10)$$

Solving this formula with respect to θ, we obtain the following:

$$\theta = \tan^{-1}\left(\frac{-G_{dx}}{G_{dy}\sin\phi + G_{dz}\cos\phi}\right) \quad (11)$$

Next, we consider how to detect the yaw angle φ using Formula (2). The following formula is obtained by multiplying the two sides of Formula (2) by the roll and pitch in the opposite direction as with Formula (6).

$$R_z(\psi)\begin{pmatrix} B\cos\delta \\ 0 \\ B\sin\delta \end{pmatrix} = \begin{pmatrix} \cos\psi & \sin\psi & 0 \\ -\sin\psi & \cos\psi & 0 \\ 0 & 0 & 1 \end{pmatrix}\begin{pmatrix} B\cos\delta \\ 0 \\ B\sin\delta \end{pmatrix} = R_y(-\theta)R_x(-\phi)B_d \quad (12)$$

The output of the geomagnetic sensor is defined as represented below, thus expanding Formula (12).

$$B_d = \begin{pmatrix} B_{dx} \\ B_{dy} \\ B_{dz} \end{pmatrix} \quad (13)$$

$$\begin{pmatrix} \cos\psi B\cos\delta \\ -\sin\psi B\cos\delta \\ B\sin\delta \end{pmatrix} = \begin{pmatrix} \cos\theta & 0 & \sin\theta \\ 0 & 1 & 0 \\ -\sin\theta & 0 & \cos\theta \end{pmatrix}\begin{pmatrix} 1 & 0 & 0 \\ 0 & \cos\phi & -\sin\phi \\ 0 & \sin\phi & \cos\phi \end{pmatrix}\begin{pmatrix} B_{dx} \\ B_{dy} \\ B_{dz} \end{pmatrix}$$

$$= \begin{pmatrix} \cos\theta & \sin\theta\sin\phi & \sin\theta\cos\phi \\ - & \cos\phi & -\sin\phi \\ -\sin\theta & \cos\theta\sin\phi & \cos\theta\cos\phi \end{pmatrix}\begin{pmatrix} B_{dx} \\ B_{dy} \\ B_{dz} \end{pmatrix}$$

$$= \begin{pmatrix} H_x \\ H_y \\ H_z \end{pmatrix} \quad (14)$$

θ and φ are known. Defining the right side of Formula (13) as represented in Formula (14), we obtain the following:

$$\cos \psi B \cos \delta = H_x \quad (15)$$

$$\sin \psi B \cos \delta = -H_y \quad (16)$$

We find φ from Formulas (15) and (16).

$$\psi = \tan^{-1}\left(\frac{-H_y}{H_x}\right) \quad (17)$$

From the above, it is clear that the postures of the wearable terminal 100 and the smartphone 200 can be found by using the acceleration sensors and geomagnetic sensors.

By using this posture information, it is possible to know in what postures the speaker 10 and the microphone 20 of the wearable terminal 100 and the speakers 110 and the microphone 120 of the smartphone 200 face each other. Of course, it is difficult to detect the absolute positional relationship between the wearable terminal 100 and the smartphone 200. Therefore, it is difficult to deal, for example, with horizontal displacement or displacement along height. However, so long as each of the wearable terminal 100 and the smartphone 200 is located within the divergence angle of the speaker of the counterpart terminal, sonic distance measurement is possible. Therefore, distance measurement rarely becomes difficult to conduct.

We consider the angle formed between the orientations of the wearable terminal 100 and the smartphone 200. Here, we assume, for reasons of convenience, that the speaker and the microphone are oriented in the same direction as the device thereof.

The orientation of the wearable terminal 100 is denoted by a unit vector w, and that of the smartphone 200 by a unit vector s. When the angle formed between the two vectors is denoted by β, β is expressed by the following formula:

$$\beta = \cos^{-1}(w \cdot s) \quad (18)$$

Figure 17:
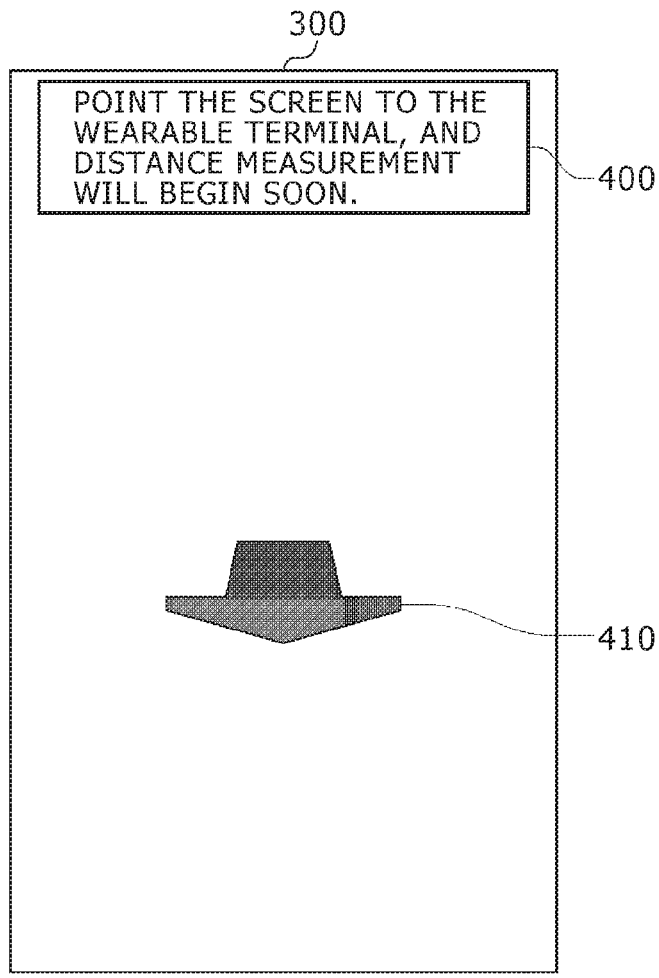
FIG. 17 is a diagram describing a screen instructing the user to point the smartphone speakers to the wearable terminal.

When the angle β is 180 degrees, the wearable terminal 100 and the smartphone 200 either (1) face each other or (2) face in opposite directions. As described with reference to FIG. 17, an interface is used which indicates the proper orientation of the speaker to the user. Therefore, it is unlikely that many users will point the smartphone 200 in the opposite direction as in case (2). So long as the smartphone 200 faces the wearable terminal 100, it is possible to determine whether the wearable terminal 100 is oriented in the proper direction.

Note that it is not necessary for the angle β to be 180 degrees. For example, when the maximum displacement in orientation in the presence of which distance measurement can be conducted is denoted by $\theta_{max}$, it is only necessary to satisfy the following formula:

$$180 - \theta_{max} \leq \beta \leq 180 + \theta_{max} \quad (19)$$

The value of $\theta_{max}$ can be found, for example, experimentally.

Figure 19:
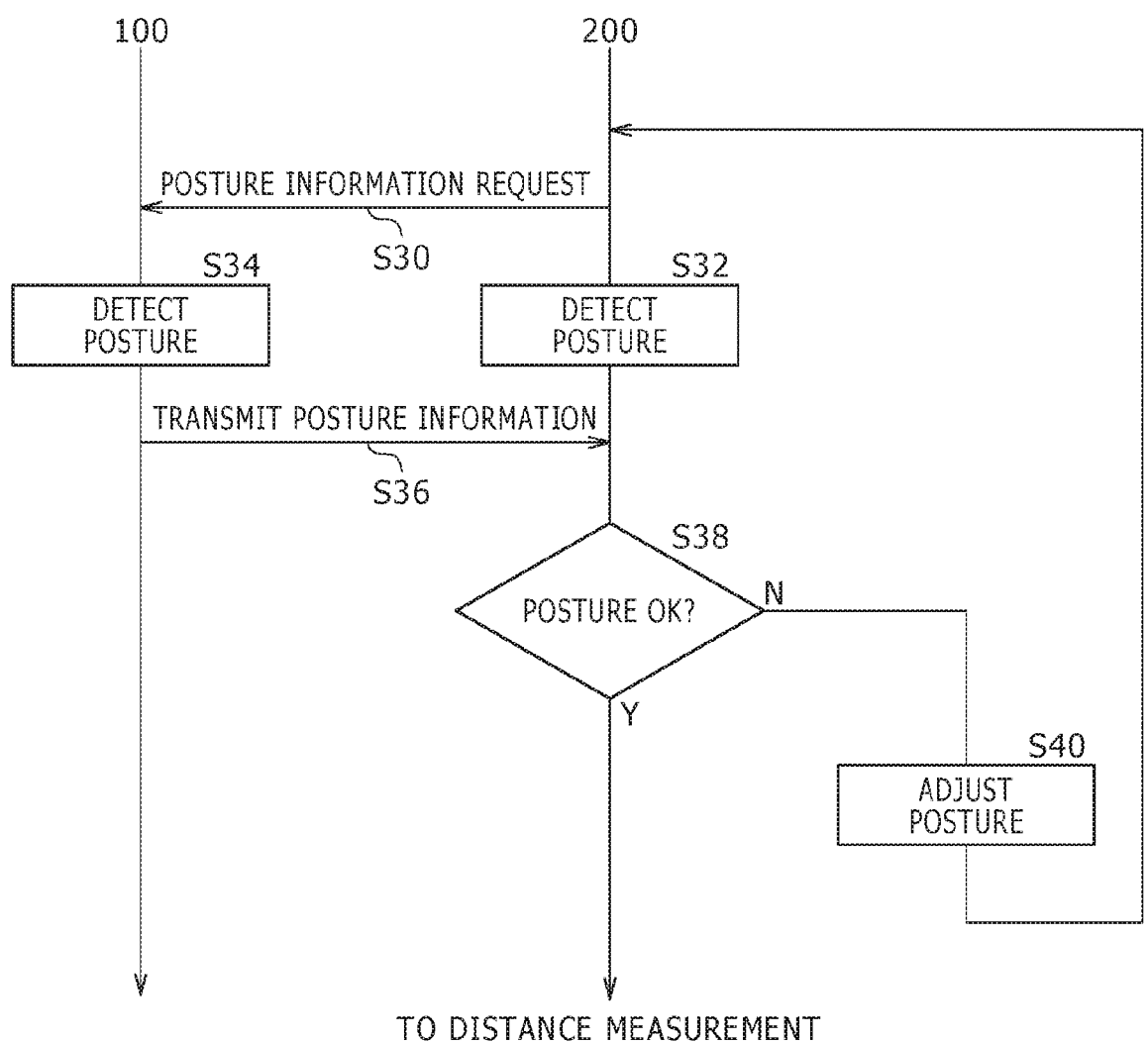
FIG. 19 is a diagram describing a flow of distance measurement using posture detection of the wearable terminal and the smartphone.

FIG. 19 is a diagram describing a flow of distance measurement using posture detection of the wearable terminal 100 and the smartphone 200.

The smartphone 200 transmits a posture information request signal to the wearable terminal 100 by Bluetooth (registered trademark) or other short-range wireless communication technology (S30). The smartphone 200 detects the posture of its own with the acceleration and geomagnetic sensors (S32).

In response to the posture information request signal from the smartphone 200, the wearable terminal 100 detects its own posture (S34), transmitting detected posture information to the smartphone 200 (S36).

In response to the posture information from the wearable terminal 100, the smartphone 200 makes a determination for posture on the basis of the pieces of orientation information of the wearable terminal 100 and the smartphone 200 (S38). More specifically, the smartphone 200 finds the angle β formed between the orientations of the wearable terminal 100 and the smartphone 200 using Formula (18), thus investigating whether the angle β falls within the range represented in Formula (19).

When the angle β satisfies Formula (19) (Y in S38), control proceeds to the distance measurement process described with reference to FIG. 2. If the angle β does not satisfy Formula (19) (N in S38), a message appears on the screen 300 of the smartphone 200 to urge the user to adjust the orientations of the wearable terminal 100 and the smartphone 200 (S40). When the user changes the orientations of the wearable terminal 100 and/or the smartphone 200, control returns to step S30 to repeat the steps from there onward.

As described above, in the sonic distance measurement method according to the present embodiment, a mobile terminal is placed at an end point of the target to be measured, with other terminal placed at the other end point of the target to be measured. The mobile terminals transmit signal sounds to each other. Each of the mobile terminals records its own signal sound and the signal sound of the counterpart terminal. The difference is found between the recording start time of the sound wave of the signal sound recorded by each of the mobile terminals and that of the sound wave of the signal sound recorded by the counterpart terminal, thus calculating the signal sound propagation time from the time difference between the recording start times of the two mobile terminals and calculating the distance between the mobile terminals.

Each of the mobile terminals can find, independently of the counterpart terminal, the difference between the recording start times of the own signal sound and that of the counterpart terminal, thus providing advantageous effects including no necessity for synchronization of the two mobile terminals in time and no necessity for calibration.

The reproducing time of a distance measurement signal is not obtained, for example, from the central processing unit (CPU) clock counter. Instead, the time when the recording of the distance measurement signal sound actually starts is acquired, thus allowing for measurement of the recording start time without being affected by the time scheduling of the operating system. Further, the recording start time of the distance measurement signal sound is found from the edges of the envelope of the recorded signal sound waves, thus making it possible to find the accurate recording start time with the accuracy of the signal sampling period.

Further, the noise level is measured in advance during sonic distance measurement using a sound meter, and distance measurement is conducted only when distance measurement accuracy is guaranteed. Monitoring the surrounding noise condition makes it possible to automatically start distance measurement and notify the user of a decline in sound level by an alarm, thus allowing for selecting a timing with minimal noise even in a noise-exposed environment for high accuracy in distance measurement.

Still further, selecting, for a distance measurement signal, a frequency band unlikely to be affected by noise, through noise frequency analysis ensures high accuracy in distance measurement even in an environment constantly exposed to noise in a specific frequency band.

Thus, the present disclosure has been described on the basis of embodiments. It is to be understood by those skilled in the art that these embodiments are illustrative, that the combination of components and processes can be modified in various ways, and that such modification examples also fall within the scope of the present disclosure.

As one of such modification examples, transmission of outbound and inbound signals may be repeated 'n' times, followed by finding the propagation time TOF of the signal sound from the difference between 'n' sets of recording start times to provide 'n'-fold measurement accuracy, rather than finding the propagation time of the signal sound by using the first and second distance measurement signals (outbound and inbound signals) as in the present embodiment.

The present technology contains subject matter related to that disclosed in Japanese Priority Patent Application JP 2015-077030 filed in the Japan Patent Office on Apr. 3, 2015, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal comprising: a reproducing section adapted to reproduce a first distance measurement signal; a recording section adapted to record the first distance measurement signal and a second distance measurement signal output from other mobile terminal; a time difference measurement section adapted to measure a first difference between recording start times of the first and second distance measurement signals; a communication section adapted to receive a second difference between recording start times of the first and second distance measurement signals from the other mobile terminal, the second difference being measured by the other mobile terminal; a distance calculation section adapted to calculate a distance to the other mobile terminal by multiplying the subtraction result between the first and second differences by the speed of sound; and a display section adapted to display information indicating that distance measurement is difficult to conduct until an environmental noise level falls down to a given threshold or less, wherein the distance measurement is not performed until the environmental noise level falls down to the given threshold or less, wherein a first posture of the mobile terminal is compared to a second posture of the other mobile terminal, and wherein distance measurement is only conducted if the first posture and the second posture match a predefined relationship.

2. The mobile terminal of claim 1 further comprising: an edge detection section adapted to detect the recording start times of the first and second distance measurement signals by detecting edges of an envelope of sound waves of the first and second distance measurement signals.

3. The mobile terminal of claim 1 still further comprising: a frequency conversion section adapted to acquire an environmental sound spectrum component by converting an environmental sound into a frequency range; and a frequency selection section adapted to select, as a frequency band of the distance measurement signal sound, a frequency range in which an environmental sound spectrum component does not exceed the maximum measurable noise level, wherein the reproducing section reproduces the first distance measurement signal in the frequency band selected by the frequency selection section.

4. The mobile terminal of claim 1, wherein the other mobile terminal is a wearable terminal, and the communication section communicates with the wearable terminal by a short-range wireless communication technology.

5. A sonic distance measurement system comprising: first and second mobile terminals; wherein the first mobile terminal includes a reproducing section adapted to reproduce a first distance measurement signal, a recording section adapted to record the first distance measurement signal and a second distance measurement signal output from the second mobile terminal, a time difference measurement section adapted to measure a first difference between recording start times of the first and second distance measurement signals, a communication section adapted to receive a second difference between recording start times of the first and second distance measurement signals from the second mobile terminal, the second difference being measured by the second mobile terminal, and a distance calculation section adapted to calculate a distance to the second mobile terminal by multiplying the subtraction result between the first and second differences by the speed of sound; and the second mobile terminal includes a reproducing section adapted to reproduce the second distance measurement signal, a recording section adapted to record the second distance measurement signal and the first distance measurement signal output from the first mobile terminal, a time difference measurement section adapted to measure the second difference between the recording start times of the first and second distance measurement signals, and a communication section adapted to transmit the second difference, measured by the time difference measurement section, to the first mobile terminal, wherein the distance is not calculated until an environmental noise level falls down to a given threshold or less, wherein a first posture of the first mobile terminal is compared to a second posture of the second mobile terminal, and wherein the distance is not calculated if the first posture and the second posture match a predefined relationship.

6. A sonic distance measurement method comprising: reproducing a first distance measurement signal at a mobile terminal; recording the first distance measurement signal and a second distance measurement signal output from a wearable terminal; measuring a first difference between recording start times of the first and second distance measurement signals; receiving a second difference between the recording start times of the first and second distance measurement signals from the wearable terminal, the second difference being measured by the wearable terminal; and calculating a distance to the wearable terminal by multiplying the subtraction result between the first and second differences by the speed of sound, wherein the distance to the wearable terminal is not calculated until an environmental noise level falls down to a given threshold or less, wherein a first posture of the wearable terminal is compared to a second posture of the mobile terminal, and wherein the distance to the wearable terminal is not calculated if the first posture and the second posture do not match a predefined relationship.

7. A non-transitory computer readable medium having stored thereon a program for a computer, the program comprising: by a reproducing section of a mobile terminal, reproducing a first distance measurement signal; by a recording section, recording the first distance measurement signal and a second distance measurement signal output from a wearable terminal; by a time difference measurement section, measuring a first difference between recording start times of the first and second distance measurement signals; by a communication section, receiving a second difference between the recording start times of the first and second distance measurement signals from the wearable terminal, the second difference being measured by the wearable terminal; and by a distance calculation section, calculating a distance to the wearable terminal by multiplying the subtraction result between the first and second differences by the speed of sound, wherein the distance to the wearable terminal is not calculated until an environmental noise level falls down to a given threshold or less, wherein a first posture of the wearable terminal is compared to a second posture of the mobile terminal, and wherein the distance to the wearable terminal is not calculated if the first posture and the second posture do not match a predefined relationship.

* * * * *